(12) United States Patent
Brisebois et al.

(10) Patent No.: US 10,382,986 B2
(45) Date of Patent: Aug. 13, 2019

(54) FACILITATING MOBILE DEVICE SELF-OPTIMIZING TECHNOLOGY SELECTION THRESHOLDS IN A WIRELESS COMMUNICATION SYSTEM

(71) Applicants: AT&T Mobility II LLC, Atlanta, GA (US); AT&T Intellectual Property I, L.P., Atlanta, GA (US)

(72) Inventors: Arthur Brisebois, Cumming, GA (US); Kurt Huber, Kennesaw, GA (US); Jeffrey Mikan, Atlanta, GA (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 110 days.

(21) Appl. No.: 15/462,112

(22) Filed: Mar. 17, 2017

(65) Prior Publication Data
US 2018/0270677 A1    Sep. 20, 2018

(51) Int. Cl.
*H04W 24/04* (2009.01)
*H04W 24/08* (2009.01)
(Continued)

(52) U.S. Cl.
CPC ........... *H04W 24/08* (2013.01); *H04L 47/283* (2013.01); *H04W 28/0236* (2013.01); *H04W 36/00* (2013.01); *H04W 48/20* (2013.01); *Y02D 70/00* (2018.01); *Y02D 70/10* (2018.01); *Y02D 70/12* (2018.01); *Y02D 70/122* (2018.01);
(Continued)

(58) Field of Classification Search
None
See application file for complete search history.

(56) References Cited

U.S. PATENT DOCUMENTS 8,262,151 B2    9/2012   De Queiroz et al.
8,724,603 B2    5/2014   Barbu et al.
(Continued)

FOREIGN PATENT DOCUMENTS

KR    20130119161 A    10/2013

OTHER PUBLICATIONS

Gupta et al., "Power Consumption and Conservation in WiFi Based Phones: A Measurement-Based Study," 4th Annual IEEE Communications Society Conference on Sensor, Mesh and Ad Hoc Communications and Networks, 2007, IEEE, 10 pages.

*Primary Examiner* — Duc T Duong
(74) *Attorney, Agent, or Firm* — Amin, Turocy & Watson, LLP

(57) ABSTRACT

Techniques that facilitate mobile device self-optimizing technology selection thresholds for a wireless communication system are provided. In one example, a method comprises: generating, at a first time, first information in a repository of information specific to and stored at the apparatus, wherein the first information comprises an identifier for a first access point device and a determined acceptable signal strength usable to obtain an acceptable jitter value between the apparatus and the first access point device; and initiating a defined type of communication via the first access point device, at a second time, based on a first determination that a detected signal strength at a third time satisfies a defined condition relative to the acceptable signal strength, wherein the second time is after the first time and wherein the third time is between the first time and the second time.

20 Claims, 24 Drawing Sheets

(51) Int. Cl.
  *H04W 36/08* (2009.01)
  *H04L 12/841* (2013.01)
  *H04W 36/00* (2009.01)
  *H04W 28/02* (2009.01)
  *H04W 48/20* (2009.01)

(52) U.S. Cl.
  CPC .......... *Y02D 70/124* (2018.01); *Y02D 70/126* (2018.01); *Y02D 70/1224* (2018.01); *Y02D 70/1242* (2018.01); *Y02D 70/1262* (2018.01); *Y02D 70/14* (2018.01); *Y02D 70/142* (2018.01); *Y02D 70/144* (2018.01); *Y02D 70/146* (2018.01); *Y02D 70/162* (2018.01); *Y02D 70/166* (2018.01); *Y02D 70/23* (2018.01)

(56) References Cited

U.S. PATENT DOCUMENTS

| | | | |
|---|---|---|---|
| 8,903,381 B2 | 12/2014 | Garg et al. | |
| 9,125,124 B2 | 9/2015 | Dwivedi et al. | |
| 9,380,646 B2 | 6/2016 | Cui et al. | |
| 9,420,505 B1 | 8/2016 | Damenti | |
| 9,819,610 B1* | 11/2017 | Crump | H04L 47/805 |
| 2004/0223470 A1* | 11/2004 | Smith | H04L 63/10 370/332 |
| 2008/0212537 A1 | 9/2008 | Bukai | |
| 2012/0170471 A1* | 7/2012 | Brown | H04W 48/20 370/252 |
| 2013/0322329 A1* | 12/2013 | Visuri | H04W 48/16 370/328 |
| 2014/0315536 A1* | 10/2014 | Chow | H04W 8/18 455/419 |
| 2015/0098393 A1 | 4/2015 | Totighbakhsh et al. | |
| 2015/0215832 A1 | 7/2015 | Fitzpatrick | |
| 2015/0282013 A1 | 10/2015 | Kim et al. | |
| 2015/0341211 A1* | 11/2015 | Saha | H04L 41/0823 709/221 |
| 2015/0373574 A1 | 12/2015 | Gordon et al. | |
| 2016/0112520 A1 | 4/2016 | Ganu | |
| 2016/0286473 A1 | 9/2016 | Huang et al. | |
| 2016/0373944 A1* | 12/2016 | Jain | H04L 43/50 |
| 2017/0238199 A1* | 8/2017 | Ponnuswanny | H04W 24/08 370/252 |
| 2017/0257670 A1* | 9/2017 | Hardt | H04N 21/44218 |
| 2018/0176845 A1* | 6/2018 | Visuri | H04W 36/22 |

* cited by examiner

ACCESS POINT DEVICE INFORMATION REPOSITORY 104

| ACCESS POINT DEVICE ID | FREQUENCY | SERVICE | JITTER | SIGNAL STRENGTH | TYPE OF DEVICE |
|---|---|---|---|---|---|
| 1123 | 2.4 GHz | VoWiFi | 90 ms (9 AM – 9 PM) 75 ms (9 PM – 2 AM) | -75 dBm | Samsung XXY |
| 1123 | 5 GHz | VoWiFi | 85 ms | -80 dBm | Samsung XXY |
| 1123 | 5 GHz | Video Streaming | 75 ms | -80 dBm | Samsung XXY |
| 2392 | 2.4 GHz | RFID scanning | 99 ms | -85 dBm | Samsung XXY |
| 2392 | 2.4 GHz | VoWiFi | 95 ms | -80 dBm | Samsung XXY |
| 2392 | 2.4 GHz | Video Streaming | 93 ms | -80 dBm | Samsung XXY |

FIG. 3A

ACCESS POINT DEVICE INFORMATION REPOSITORY 104 — 300A

| ACCESS POINT DEVICE ID | SERVICE | JITTER | SIGNAL STRENGTH | TYPE OF DEVICE |
|---|---|---|---|---|
| 1123 | User Profile 1 / VoWiFi | 90 ms | -75 dBm | Apple IIQQ |
| 1123 | User Profile 2 / VoWiFi | 85 ms | -80 dBm | Apple IIQQ |
| 5592 | User Profile 1 / Video Streaming | 75 ms | -80 dBm | Apple IIQQ |
| 6223 | User Profile 1 / RFID scanning | 99 ms | -85 dBm | Apple IIQQ |
| 2392 | User Profile 1 / VoWiFi | 95 ms | -80 dBm | Apple IIQQ |
| 2392 | User Profile 2 / Video Streaming | 93 ms | -80 dBm | Apple IIQQ |

FIG. 3B

ACCESS POINT DEVICE INFORMATION REPOSITORY 104

FIG. 3C

ACCESS POINT DEVICE INFORMATION REPOSITORY 104

- SOME HISTORY OF INTERFERENCE
- HIGH JITTER; LIKELY CONGESTION
- DEFAULT VALUE; LIKELY NEVER ACCESSED
- DEFAULT VALUE; LIKELY NEVER ACCESSED
- SOME HISTORY OF INTERFERENCE
- SOME HISTORY OF INTERFERENCE
- HIGH JITTER; LIKELY CONGESTION
- LOW INTERFERENCE AND LIGHT; LOADED
- PROPERLY MANAGED ENTERPRISE DEVICE

FIG. 3D

FACILITATING MOBILE DEVICE SELF-OPTIMIZING TECHNOLOGY SELECTION THRESHOLDS IN A WIRELESS COMMUNICATION SYSTEM

TECHNICAL FIELD

The subject disclosure relates generally to communications systems, and, for example, to systems, methods and/or machine-readable storage media for facilitating mobile device self-optimizing technology selection thresholds for a wireless communication system.

BACKGROUND

Wireless data traffic has increased at a significant rate since the advent of smart phones, yet average revenue per user has decreased. Network operators typically increase cellular network efficiency in order to satisfy data use growth and profitability targets. They also make use of less expensive wireless data transport mechanisms (e.g., broadcast, Wireless Fidelity (Wi-Fi)) to serve more traffic with less cellular network capacity and less cost impact, which is typically referred to as data offload. Jitter can be a detriment to provisioning services in various types of systems, however. As such, approaches that reduce the use of bad Wi-Fi for jitter-sensitive services, in a battery-efficient way are desirable.

BRIEF DESCRIPTION OF THE DRAWINGS

FIGS. 3A, 3B, 3C and 3D illustrate example, non-limiting examples of information tables of information to facilitate mobile device self-optimizing technology selection thresholds in accordance with one or more embodiments described herein.

DETAILED DESCRIPTION

Figure 1A:
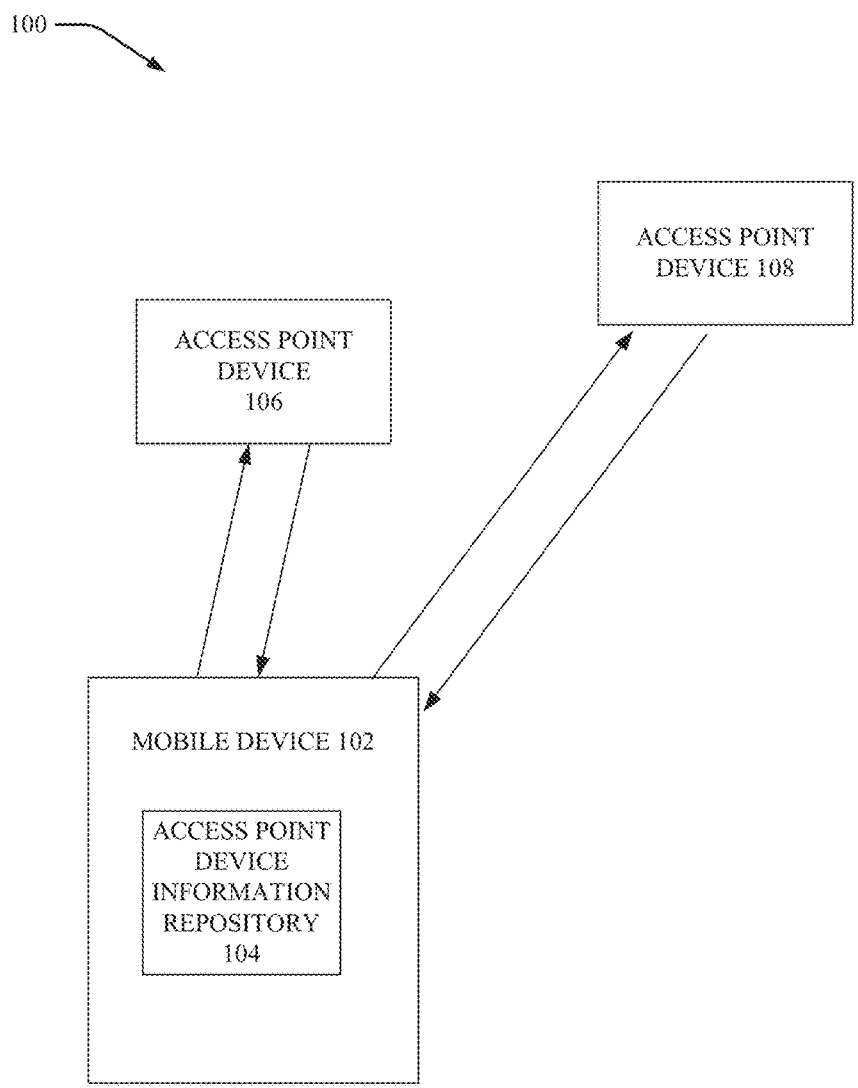
FIGS. 1A, 1B and 1C illustrate example, non-limiting diagrams of systems facilitating mobile device self-optimizing technology selection thresholds in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example"

or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

Wireless data traffic has increased at a significant rate since the advent of smart phones, yet average revenue per user has decreased. Network operators typically increase cellular network efficiency in order to satisfy data use growth and profitability targets. They also make use of less expensive wireless data transport mechanisms (e.g., broadcast, Wireless Fidelity (Wi-Fi)) to serve more traffic with less cellular network capacity and less cost impact, which is typically referred to as data offload. Jitter can be a detriment to provisioning services in various types of systems, however. As such, approaches that reduce the use of bad Wi-Fi for jitter-sensitive services, in a battery-efficient way are desirable. As used herein, the term "Wi-Fi" can represent generally communication to/from a local (e.g., home or business) access point device. For example, voice over Wi-Fi can be voice communication provided via a local access point device. Wi-Fi radio can mean radio communications via a local access point device.

Data offload mechanisms are expected to deliver a seamless experience. Wi-Fi radio and transport resources are typically provided by the subscriber or third parties, and are not managed by network operators. Wi-Fi radio and transport are therefore relatively unpredictable in terms of jitter performance. However, the subscriber/user of the mobile device should not be able to tell the difference between a voice call delivered over voice over LTE (VoLTE) or voice over Wi-Fi (VoWi-Fi). Voice or other jitter-sensitive services can be a challenge over Wi-Fi because: (1) voice is a real-time service for which packet flow consistency is critical (e.g., if voice packets are not received in order and according to a constant and evenly-spaced flow (jitter), voice packet playback can result in distorted and otherwise unintelligible voice call experiences); (2) end-to-end Wi-Fi transmission quality (jitter) is affected by much more than signal strength (e.g., Wi-Fi jitter can degrade when signal strength is low and Wi-Fi jitter can also degrade when there is interference from other Wi-Fi access points (e.g., access point devices that provide Wi-Fi communication), other users sharing overloaded Wi-Fi radio or transport (DSL line, for example) resources).

One or more embodiments can provide best effort data services (e.g., Internet browsing), real-time services, non-real-time services and/or jitter-sensitive services for different types of mobile devices. While VoLTE to voice over Wi-Fi (VoWi-Fi) data offload examples are provided herein in describing some of the embodiments, other embodiments envisage other protocols, services and/or technology/device combinations (e.g., smart phones, radio frequency identification (RFID) devices, etc.) and all such embodiments are intended to be included within the scope herein.

Systems, methods and/or machine-readable storage media for facilitating mobile device self-optimizing technology selection thresholds for a wireless communication system are discussed. One or more embodiments can address the local mobile device, the local access point device and the issue of an acceptable signal strength threshold for connecting to the access point device. An acceptable signal strength can be a signal strength that can facilitate a desired level of quality (e.g., for a particular type of service and, as such, the level of acceptable quality can differ depending on whether a service is jitter-sensitive, best-effort, real-time or another type of service). The signal strength can take into account one or more variables, including, but not limited to, the specific service of interest (e.g., VoWiFI, VoLTE, video streaming, etc.), user profile (e.g., a first user of a mobile device or a second user of the mobile device), access point device (e.g., a first access point device or a second access point device), technology (e.g., a SAMSUNG® brand mobile device versus an APPLE® brand mobile device) or the like.

In one embodiment, an apparatus is provided. The apparatus can comprise a processor; and a memory that stores executable instructions that, when executed by the processor, facilitate performance of operations. The operations can comprise: generating, at a first time, first information in a repository of information specific to and stored at the apparatus, wherein the first information comprises an identifier for a first access point device and a determined acceptable signal strength usable to obtain an acceptable jitter value between the apparatus and the first access point device; initiating a defined type of communication via the first access point device, at a second time, based on a first determination that a detected signal strength at a third time satisfies a defined condition relative to the acceptable signal strength, wherein the second time is after the first time and wherein the third time is between the first time and the second time; and based on a second determination that a detected signal strength at the third time fails to satisfy the defined condition relative to the acceptable signal strength and in response to identifying a change in the detected signal strength to at least the determined acceptable signal strength, switching from being connected to a network device to the first access point device to initiate the defined type of communication via the first access point device.

In another embodiment, a method is provided. The method can comprise: generating, by a device comprising a processor, at a first time, first information in a data store of information specific to and stored at the device, the first information comprising an identifier for a first access point device and a determined acceptable signal strength to obtain an acceptable jitter value between the device and the first access point device; and initiating, by the device, a defined type of communication via the first access point device, at a second time, based on a first determination that a detected signal strength at a third time meets a condition defined relative to the acceptable signal strength, wherein the third time is between the first time and the second time.

In yet another embodiment, a machine-readable storage medium is provided. The machine-readable storage medium can comprise executable instructions that, when executed by a processor, facilitate performance of operations, comprising: determining respective acceptable signal strengths based on tests performed for different access point devices, wherein the respective acceptable signal strengths are device specific and user profile specific; changing a default signal strength value stored in the device to the respective acceptable signal strengths; and determining whether to connect to a specified access point device of the different access point devices based on whether a measured signal strength for the specified access point device is at least equal to an acceptable signal strength for the specified access point device.

One or more embodiments described herein can efficiently use a mixture of licensed and unlicensed wireless technologies for reliable delivery of services (e.g., real-time services) in a battery-efficient way. An improvement in service reliability, reduction in costs and/or improvement in device battery life can result. One or more embodiments can facilitate mobile device self-optimizing technology selection as a self-learning method for the mobile device to tune thresholds used for the selection of wireless transport technologies. These embodiments can be employed for any number of different types of services; however, the embodiments can be employed for real-time and/or other jitter-sensitive services. In one embodiments described herein, jitter measurements can be used to assess the performance of a prospective network path, and signal strength thresholds can be automatically adjusted to allow or disallow use of the prospective radio path for specific services.

In some embodiments, jitter performance can be managed to provide a more predictable user experience from a jitter perspective by reducing the likelihood, or avoiding altogether, the need for repeated jitter measurements between a mobile device and a particular access point. Such can improve the battery life of a mobile device and/or provide intensive services in a battery-efficient way. Avoiding or reducing the likelihood of repeated jitter measurement can also reduce drain on network resources. As such, one or more embodiments can also prevent use of bad Wi-Fi for jitter-sensitive services in a battery-efficient way.

One or more embodiments described herein can provide a battery-efficient approach to assess Wi-Fi quality for use with services. For example, the services can be real-time and/or jitter-sensitive services. With self-adjusting thresholds, jitter measurements can be taken less often, yet the experience for the subscriber/user of the mobile device can be preserved. This capability can enable more aggressive use of Wi-Fi offload (e.g., Wi-Fi preferred) without compromising battery life or experience of the subscriber/user of the mobile device.

Figure 1B:
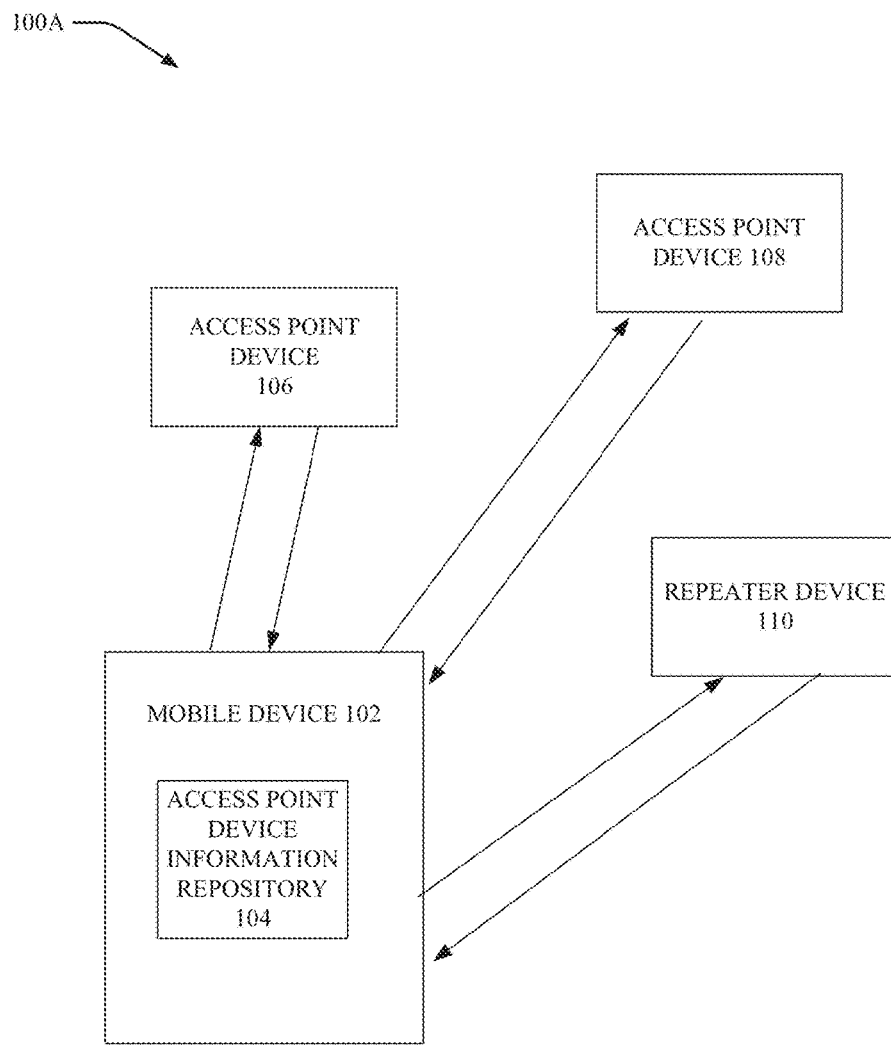
Figure 1C:
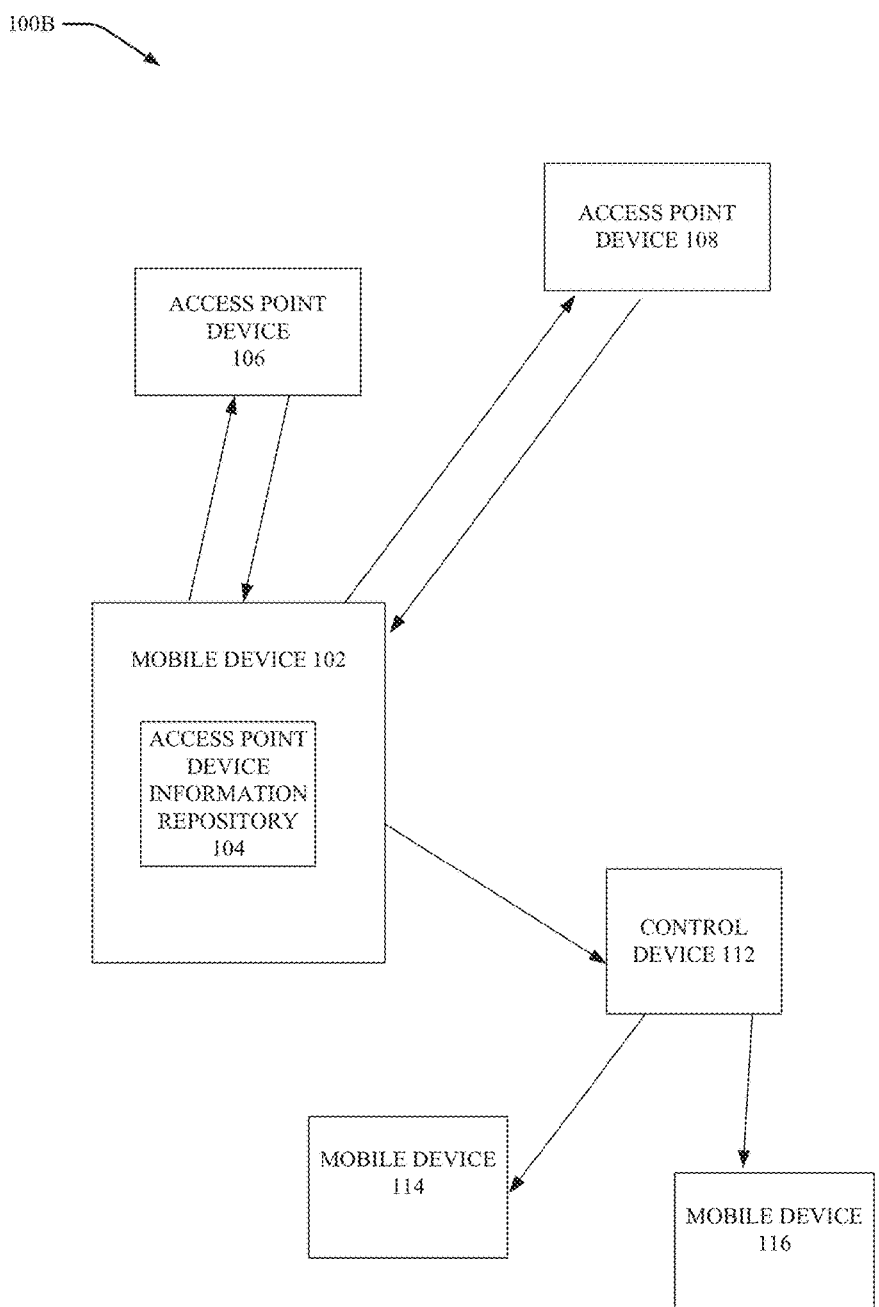

FIGS. 1A, 1B and 1C illustrate example, non-limiting diagrams of systems facilitating mobile device self-optimizing technology selection thresholds in accordance with one or more embodiments described herein. For networks controlled by a particular network operator, there can be self-optimizing networks since the network operator can adjust signal-to-noise ratio (SNR); however, in one or more embodiments described herein, the network cannot be optimized because the network is not controlled by the particular operator. In these embodiments, one or more embodiments described herein can re-focus to an optimization from a device level as opposed to a network level.

The systems 100, 100A, 100B show different embodiments that can facilitate mobile device self-optimizing technology selection. For example, technology selection can be a selection by the mobile device 102 (or, in the embodiment of FIG. 1C, mobile devices 102, 114, 116) of one or more different access point devices (e.g., access point devices 106, 108), selection by the mobile device 102 of a repeater device 110 of an access point device 106 (in lieu of the access point device 108), selection of a particular frequency of one or more of access point devices 106, 108, etc.

While system 100 shows a mobile device 102 and access point devices 106, 108, in various embodiments, such as that shown in systems 100A and 100B, other components (e.g., repeater device 110, mobile devices 114, 116, control device 112) can be included. For example, in system 100A, the access point device 106 can have a repeater device 110 that can boost power from the access point device 106. As another example, in system 100B, the mobile device 102 is communicatively coupled to a control device 112 that can communicate with, provide information to and/or receive information from one or more of mobile devices 114, 116. In the system 100B, the control device 112 can access the access point device information repository 104 and/or receive from the mobile device 102 information previously stored in the access point device information repository 104. This information can be employed to facilitate self-optimizing technology selection by the mobile devices 114, 116 in some embodiments. Accordingly, mobile devices 114, 116 can utilize previously gathered information by mobile device 102 to optimize technology selection in some embodiments.

As shown in FIG. 1A, system 100 can include mobile device 102, access point devices 106, 108 that are communicatively coupled to one another. In some embodiments, as shown in FIG. 1B, system 100A can also include a repeater device 110. For example, repeater device 110 can be a repeater of access point device 108. As shown in FIG. 1C, system 100B can include multiple mobile devices 102, 114, 116, access point devices 106, 108 and/or control device 112.

Figure 4:
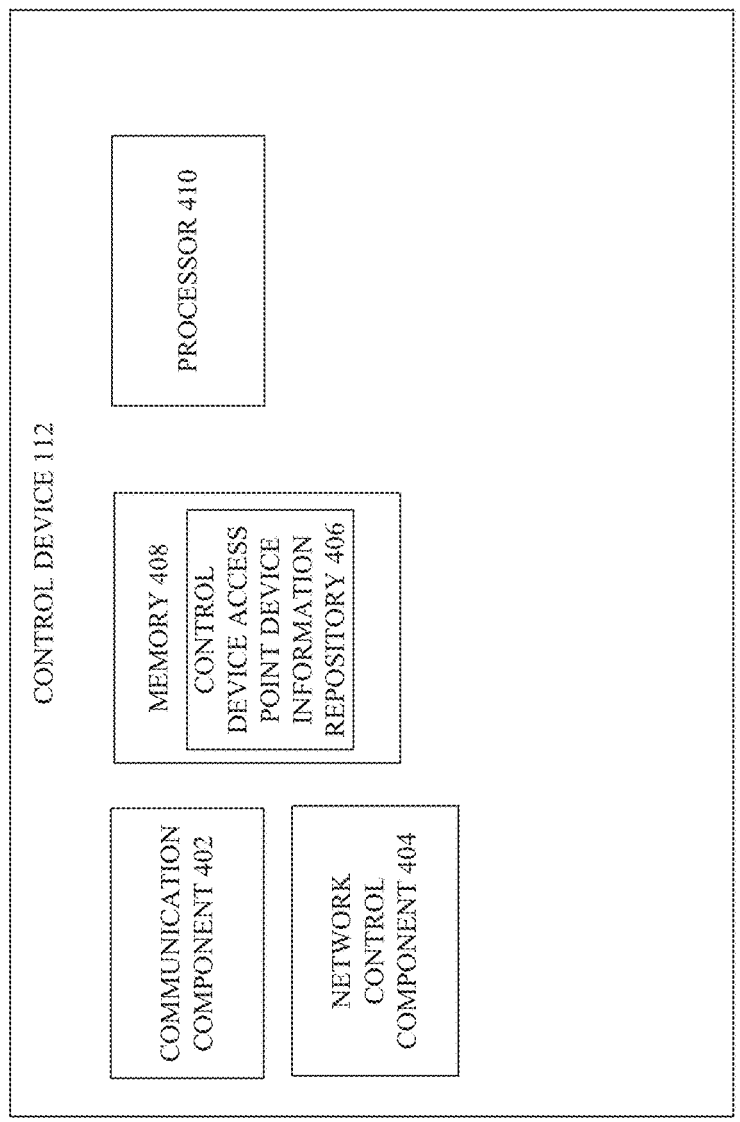
FIG. 4 illustrates an example, non-limiting diagram of a control device facilitating mobile device self-optimizing technology selection thresholds in accordance with one or more embodiments described herein.

The control device will be described in greater detail with reference to FIG. 4. FIG. 4 illustrates an example, non-limiting diagram of a control device facilitating mobile device self-optimizing technology selection thresholds in accordance with one or more embodiments described herein. Repetitive description of like elements employed in other embodiments described herein is omitted for sake of brevity.

Control device 112 can include communication component 402, network control component 404, control device access point device information repository 406, memory 408 and/or processor 410. In various embodiments, one or more of the communication component 402, network control component 404, control device access point device information repository 406, memory 408 and/or processor 410 can be electrically and/or communicatively coupled to one another to perform one or more functions of control device 112. In some embodiments, communication component 402 can transmit and/or receive from/to mobile device 102 (and/or mobile devices 114, 116 in cases such as those shown and described with reference to FIG. 1C).

In some embodiments, the control device 112 can be a network level device or another access point device that can include the communication component 402 and/or the network control component 404. In various embodiments, the communication component 402 and/or the network control component 404 can be hardware devices, software, firmware or a combination of one or more of hardware, software and/or firmware. In some embodiments, the communication component 402 can be a transmitter (or transceiver) that can receive information (e.g., information stored in access point device information repository 104) from the mobile device 102 and/or a receiver (or transceiver) that can transmit information to the mobile devices 114, 116. In some embodiments, the network control component 404 can be composed of hardware, software and/or firmware. While the embodiment shown illustrates the communication component 402 and the network control component 404 as separate from the memory 408 as shown in FIG. 4, in some embodiments, the communication component 402 and/or the network control component 404 can be included as part of memory 408 and can be executed by processor 410.

In some embodiments, the communication component 402 can receive from information stored in access point device information repository 104 (and/or such information that is accessible by mobile device 102 over a network and stored elsewhere). The communication component 402 can transmit information to the mobile devices 114, 116 that enable mobile devices 114, 116 to make one or more selections of access point devices 106, 108 (or similar access point devices) for communication with mobile devices 114, 116.

In some embodiments, in lieu of transmitting information stored in the access point device information repository 104 of the mobile device 102 and/or accessible by the mobile device 102, control device 112 can have a network control component 404 that can generate instructions for the mobile devices 114, 116 to connect to one or more different access point devices for which mobile device 102 has obtained information associated with the access point device information repository 104.

In some embodiments, the control device 112 can store the information from the mobile device 102 in the control device access point device information repository 406. For example, in some embodiments, the control device access point device information repository 408 can store information regarding one or more access point devices (e.g., access point devices 106, 108), mobile devices (e.g., mobile devices 102, 114, 116), repeater devices (e.g., repeater device 110), frequencies for access point devices and/or repeater devices, jitter, signal strength values and/or thresholds, conditions for connection to one or more different access point devices, specification of services that can be facilitated via signal strength and/or jitter (or signal strength, jitter and type of mobile device).

In some embodiments, one or more of access point devices 106, 108 can be configured to communicate via multiple frequencies. For example, in some embodiments, one or more of access point devices 106, 108 can be configured to communicate via a 2.4 Gigahertz frequency and a 5 Gigahertz frequency.

In various embodiments, access point devices 106, 108 are shown. However, as used herein, the access point devices 106, 108 can represent any number of different types of devices that can transmit and/or receive communication wirelessly, including, but not limited to, base station devices configured to facilitate cellular communication, satellites, content distribution node (CDN) devices, radio frequency identification (RFID) communication devices configured to transmit to and/or receive information from an RFID tag or the like. One or more of the access point devices 106, 108 can be configured to be updated from time to time such that performance of the access point device (e.g., jitter and/or signal strength of the access point devices 106, 108) can change from time to time. Further, different loading conditions can affect the access point devices 106, 108 such that they have different jitter and/or signal strength at different points in time.

In various embodiments, signal strength and jitter are parameters that have a strong correlation with voice quality and/or other data that is jitter-sensitive and/or typically provided as a real-time service. Accordingly, the mobile device 102 can measure signal strength to predict voice quality if the mobile device is transmitting and/or receiving voice data over the access point device and/or the mobile device 102 can measure jitter to predict voice quality if the mobile device is transmitting and/or receiving voice data over the access point device.

Figure 2:
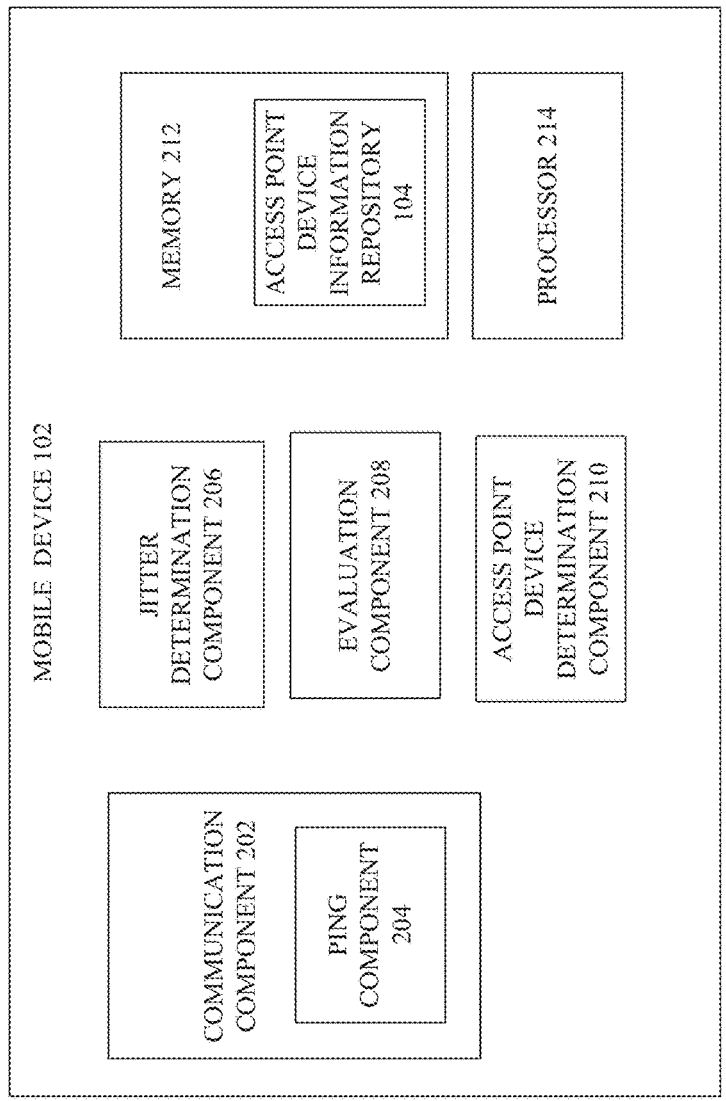
FIG. 2 illustrates an example, non-limiting diagram of a mobile device for which self-optimizing technology selection thresholds can be facilitated in accordance with one or more embodiments described herein.

The mobile device can be described with reference to FIGS. 1A, 1B, 1C and FIG. 2. As shown in FIG. 2, mobile device 102 can include a communication component 202, ping component 204, jitter determination component 206, evaluation component 208, access point device determination component 210, memory 212 (which can include access point device information repository 104 in some embodiments) and/or processor 214. In some embodiments, one or more of communication component 202, ping component 204, jitter determination component 206, evaluation component 208, access point device determination component 210, memory 212 (which can include access point device information repository 104 in some embodiments) and/or processor 214 can be electrically and/or communicatively coupled to one another to perform one or more functions of mobile device 102. Although communication component 202, ping component 204, jitter determination component 206, evaluation component 208 and/or access point device determination component 210 are shown separate from memory 212, in some embodiments, one or more of communication component 202, ping component 204, jitter determination component 206, evaluation component 208, access point device determination component 210 can be implemented as one or more instructions stored in the memory 212 that can be executed by processor 214.

In various embodiments, the communication component 202 can include hardware, software and/or a combination of hardware and software configured to transmit and/or receive information (e.g., signal from an access point device, ping acknowledgement, ping message, information to be stored in access point device information or the like) from and/or to access point device 106. For example, in various embodiments, communication component 202 can transmit and/or receive any of a number of different types of information including, but not limited to, information describing jitter, signal strength or the like. Accordingly, communication component 202 can facilitate a number of different types of functions including, but not limited to, determination of a satisfactory signal strength and jitter value for a particular access point device, transmission of such information to control device 112, determination of whether to remain connected to a first access point device or move to another access point device. The communication component 202 can detect the signal from one or more of access point devices 106, 108 when the mobile device 102 is within range of the access point devices 106, 108.

The ping component 204 can include hardware, software and/or a combination of hardware and software configured to transmit and/or receive a ping message to an access point device and/or receive an acknowledgement of receipt of the ping message from the access point device 204. For example, in some embodiments, the ping component 204 can include hardware and/or software that can format a ping message at the communication component 202 for transmission to the access point device. The ping component 204 can generate a ping message that can be transmitted and received by the communication component 202. For example, one or more ping messages can be transmitted from the mobile device 102 to an access point device (e.g., access point device 106) and the access point device 106 can transmit the ping back to the mobile device 102. One or more ping messages can be sent and received. The ping messages can be employed to determine a jitter between the mobile device and the access point device.

In some embodiments, jitter can be considered to be an average variation of latency between two end points (in this case, the mobile device 102 and one of access point devices 106, 108). In some embodiments, the mobile device 102 can transmit a ping message regularly for a defined number of time periods. For example, in one embodiment, the mobile device 102 can transmit a ping message every 20 ms to a defined internet protocol (IP) address (e.g., an IP address of access point device 106 or access point device 108) and the jitter determination component 206 can evaluate the ping message latency for 20 successive ping measurements 20 ms apart, which is a time period of 400 ms. Jitter can be defined as the variation in the ping latency for those 20 measurements. In different embodiments, the jitter determination component 206 can measure jitter in various different ways. The jitter component 206 can include hardware, software and/or a combination of hardware and software configured to measure jitter associated with a ping message. In some embodiments, the jitter component 206 can include a clock or jitter meter for measurement of jitter. All such embodiments and variations are envisaged.

The evaluation component 208 can include hardware, software and/or a combination of hardware and software configured to determine one or more signal thresholds and/or jitter values at which the mobile device 102 can communicate with a particular access point device. In some embodiments, the evaluation component 208 can determine one or more signal thresholds at which the mobile device 102 can communicate with a particular access point device to conduct one or more services (e.g., VoWi-Fi, VoLTE, RFID, video streaming, etc.) via the access point device since the one or more particular services may require or provide desired service with a particular jitter and/or signal strength.

The access point device determination component 210 can include hardware, software and/or a combination of hardware and software configured to generate a first signal that can cause the communication component 202 to connect to one access point device (e.g., access point device 106) and to generate a second signal that can cause the communication component 202 to connect to another access point device (e.g., access point device 108).

The signal strengths can be a threshold, for example, above which (or equal to which) the communication component 202 of the mobile device 102 will connect to and/or stay connected to a particular access point device for a particular service. In some embodiments, the signal strengths can be a threshold, for example, below which the mobile device 102 will forgo connection to and/or remove connection from a particular access point device for a particular service. Accordingly, in some instances, the specification of signal strength thresholds is service-specific. In other embodiments, the signal strength thresholds can be employed for any service deemed real-time or jitter-sensitive. In some embodiments, the signal strength thresholds can be service-agnostic.

As used herein, the services can vary widely. While VoLTE to voice over Wi-Fi (VoWi-Fi) service and data offload examples are provided herein in describing some of the embodiments, other embodiments (e.g., RFID, satellite, Internet of Things) can encompass other telecommunication protocols, services and/or technology/device combinations (e.g., smart phones, radio frequency identification (RFID) devices, etc.). All such embodiments are envisaged and intended to be included within the scope herein.

Figure 3C:
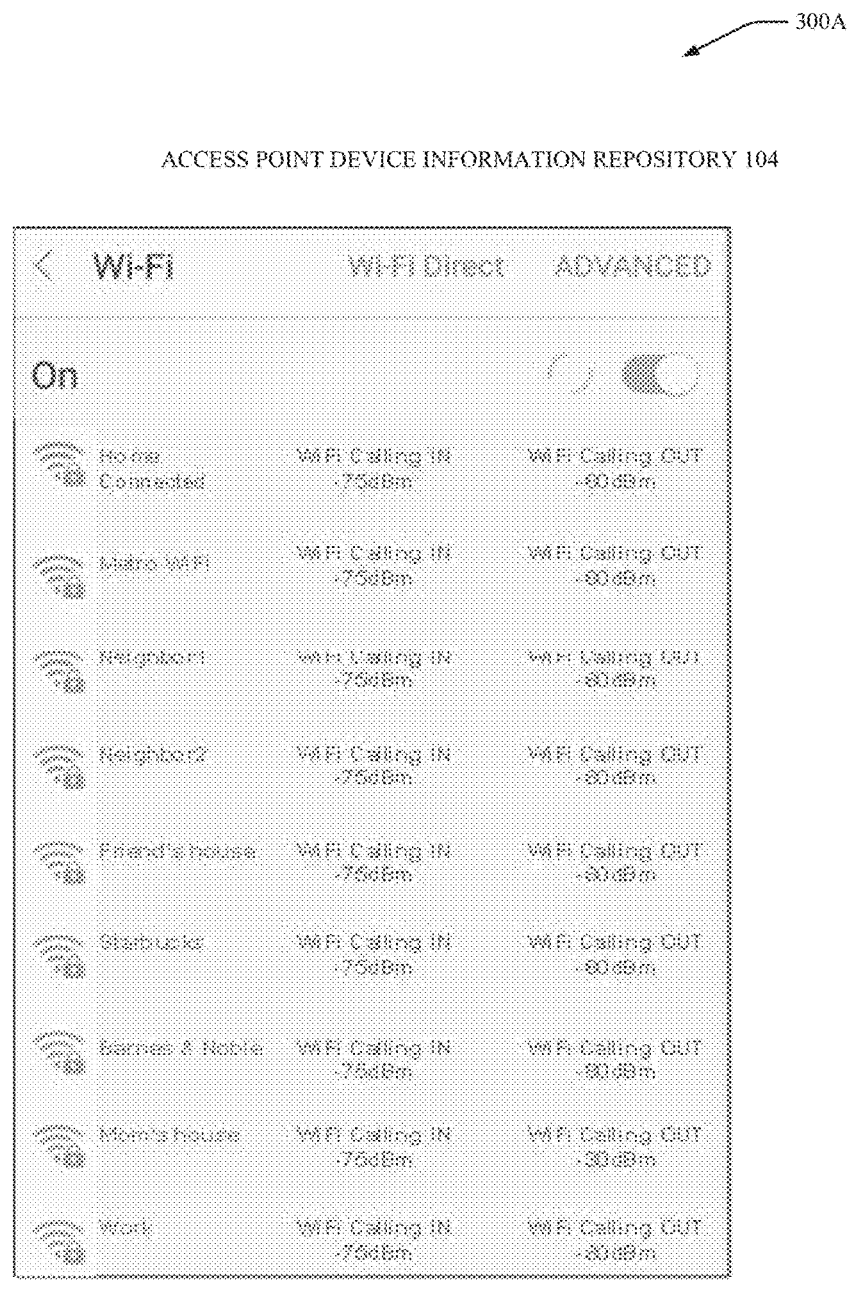

Most mobile devices utilize numerous different access point devices configured to provide services (e.g., Wi-Fi services) in many locations, so the mobile device 102 can maintain a list of access point devices configured to provide one or more different services and individualized signal strength selection thresholds for the access point devices. This list can be as illustrated in FIGS. 3A, 3B, 3C and/or 3D.

In some embodiments, the mobile device 102 can include an access point device information repository 104 at which the mobile device 102 can store information about one or more different access point devices (e.g., access point devices 106, 108). By way of example, but not limitation, as shown in FIGS. 3A, 3B, 3C and 3D, the information stored in the access point device information repository 104 can include, but is not limited to, an identifier of the access point device, at least one jitter value associated with a connection with the mobile device 102 and the access point device. In some embodiments, for one or more jitter values, an associated signal strength can also be stored.

Different jitter values can be stored for the same access point device in some instances since different times of day, days of months or months of year can result in different jitter for the same access point device.

In some embodiments, the information can include an identifier of the access point device, at least one jitter value associated with a first frequency connection with the mobile device 102 and the access point device and at least one jitter value associated with a second frequency connection with the mobile device 102. The connections need not be concurrently occurring.

In some embodiments, the information can also include information regarding the type of the mobile device 102 since different brands of mobile devices can have different jitter and/or signal strength with a particular access point device.

In one or more of the various embodiments described herein, the access point device can include an indicator of signal strength that is considered acceptable for connection for a particular type of service. In some cases, the service is indicated for the particular signal strength and therefore the information can indicate different jitter, signal strength and/or services in various different permutations.

In some embodiments, the evaluation component 208 and/or the access point device determination component 210 of the mobile device 102 can specify information that is user-specific. For example, the mobile device 102 can be associated with different user profiles for different users of the mobile device 102. Any number of variations are possible and are envisaged.

The memory 212 can store instructions that can be executed by processor 214 to transmit one or more ping messages, compute jitter, determine signal strength and jitter measurements for particular services, communicate with one or more different access point devices, etc.

In various embodiments, systems 100, 100A, 100B can provide a self-learning framework for a mobile device (e.g., mobile device 102) to tune one or more thresholds used for the selection of wireless transport technologies (e.g., in some embodiments, wireless transport technologies for real-time and/or other jitter-sensitive services). The thresholds can then be referenced to determine whether a mobile device should use a particular access point device for a particular service. Jitter measurements can be employed used to assess the performance of the prospective network path between the mobile device and an access point device. Signal strength thresholds can be automatically adjusted to allow or disallow use of the prospective radio path for specific services.

The upcoming descriptions shall refer to VoLTE (voice over LTE), VoWi-Fi (voice over Wi-Fi) and smart phone (mobile device) device examples; however, in various embodiments, one or more of the descriptions can be applied to many other service, technology and device combinations as well. Also note that these examples address Wi-Fi selection thresholds (for selection of Wi-Fi via a defined access point device for a service) but can also be used to adjust Wi-Fi exit thresholds (for determining when to leave Wi-Fi (e.g., when to leave the access point device that is offering the Wi-Fi service and move to another communication device (e.g., either another access point device, a base station device or the like for providing the service)) as well.

One or more embodiments can employ use of jitter measurements and machine learning to automatically adjust technology selection thresholds (in this case signal strength) to prevent or minimize repeated attempts to access technologies (e.g., access point devices) where probability of adequate service performance is low (or below a defined threshold). Accordingly, one or more embodiments can allow mobile devices to survey access technologies (e.g., access point devices) to determine where and/or when probability of adequate service quality is above a desired threshold thus preserving quality while conserving battery and other resources.

Accordingly, one or more embodiments described herein can identify an acceptable signal strength threshold for the mobile device 102 to employ to determine whether to connect to the access point device 106 to obtain service (e.g., an access point device 106 can provide service via Wi-Fi for example while another access point device 108 can be a base station device, for example, and it can provide service via LTE while another access point device can be a satellite transponder that can provide service via satellite). This information can be stored locally at the mobile device 102 in some embodiments. The information stored at local devices (e.g., mobile device 102 and/or at the embodiment of FIG. 1C, mobile devices 102, 114, 116) can be employed in many different scenarios, including, but not limited to, crowdsourcing information to choose the acceptable signal strength level for an access point device and/or providing the signal strength, jitter information/profile for the access point devices to other mobile devices (e.g., via the control device 112 of FIG. 1C).

A database (e.g., access point device information repository 104) of the mobile device 102 can be a database of access point device signal strengths to have a defined level of quality. Such information can be employed by the mobile device 102 (and/or mobile devices 114, 116) to benefit numerous different mobile devices. In some embodiments, access point device information repository 104 can be specific to a user profile and/or specific to a mobile device profile. A mobile device profile can be a profile of signal strength versus jitter for one or more different applications or services for a particular type of mobile device (e.g., smart phones of different brands, RFID tags, IoT devices).

As such, there can be an access point device (e.g., general, social) and a device type view can be applied to such information to specify the information for different devices (e.g., a first device may have first statistics regarding signal strength and jitter and a second device can have other statistics). As such, the mobile device metrics can be that Wi-Fi can be received better by a first type of mobile device (e.g., SAMSUNG®) or the signal strength may be low but the first type of mobile device maintains a desired throughput while a second type of mobile device (e.g., APPLE® IPHONE®) drops throughput.

In some embodiments, the access point device information repository 104 can store one or more service set identifiers (SSIDs) or actual access point device identifiers (as some access point devices perform better even at lower dBm values than other access point devices) so the access point device information repository 104 can be a per access point device list. So, as shown in FIG. 3C and FIG. 3D, there can be a list that indicates a particular access point device provides desired service until the signal reaches −83 dBm for the first type of mobile device and for the second type of mobile device, the same access point device provides desired service until −82 dBm. As used herein, the term "WiFi calling in" as shown in FIGS. 3C and 3D can be the signal strength threshold to be used in order to select the access point device for a particular service (e.g., access point device that can utilize Wi-Fi for providing the service). In some embodiments, this can be the threshold to be used when the mobile device is approaching the access point device. The term "WiFi calling out" can be the signal strength threshold to be used to de-select the access point device for a particular service (e.g., to move from the access point device that provides the Wi-Fi service to another access point device). This can be the threshold to be used when the mobile device is moving away from the access point device that provides the Wi-Fi service. In some embodiments, these thresholds are offset by 4+ dBm in order to reduce the probability of device "ping pong" (e.g., bouncing back and forth at an excessive frequency) in and out of WiFi coverage.

As described herein, these values can be the signal levels at which the mobile device receives the access point device signal. In this regard, one or more different access point devices can have different values for different types of mobile devices indicating a first access point device may have superior communication range while a second access point device may have superior communication speed, etc. Accordingly, various access point devices differ in design and benefits.

As shown in FIGS. 3A and 3B, in some embodiments, there is a device profile (e.g., FIGS. 3A, 3B), an access point device profile (e.g., FIG. 3A) and/or a user profile/characteristic (e.g., FIG. 3B). With reference to FIG. 3B, for a particular user, for example, the user profile/characteristic can indicate certain user behavior and such user behavior can be employed to make one or more determinations regarding whether to connect to Wi-Fi for a voice call being held by the user (e.g., the user never walks by the window so maintaining the call in Wi-Fi will be tougher—if the user starts walking by the window and the user begins going outside, then for a person who is sitting on a cubical wall and next to window so system may say it prefers to be anchored to the network instead of bouncing around.

One or more embodiments of the mobile devices (e.g., mobile devices 102, 114, 116) can balance the different device specific, user specific, access point device specific information to make decisions regarding the connections to make for the mobile devices (e.g., mobile devices 102, 114, 116). The mobile device can arrive at a certain access point device and the mobile device can perform a jitter test on the access point device. If the jitter test passes (e.g., jitter less than 100 ms) then the mobile device can use a default signal strength threshold (this threshold can be already defined in the mobile device specifications in some embodiments). Accordingly, when the mobile device later detects the signal strength corresponding to what has been discovered to have a passing jitter test result (e.g., when the mobile device visits the access point device again in the future), in lieu of re-checking the access point device and unnecessarily utilizing battery power, the mobile device can know that the access point device will provide an acceptable service as long as the signal strength is greater than or equal to the detected signal strength when the jitter test passed.

If the jitter test fails, the mobile device can evaluate the mobile device signal strength at which the jitter test failed and forgo registration at the access point device. For example, the mobile device can forgo registration for a defined service (e.g., the mobile device can forgo registration on the access point device for VoWi-Fi, for example). Instead, the mobile device can continue using another access point device for voice calling. The mobile device can continue to detect the signal strength for the access point device (for which the jitter test failed) from time to time and determine if the signal strength has changed. For example, the signal strength can change as different conditions arise (e.g., as a user of the mobile device moves closer or further away from the access point device the signal strength can become stronger or weaker, respectively).

In some embodiments, since conservation of mobile device battery life is important, when the mobile device joins a service, the mobile device can determine the comfort level so once a good signal strength is detected, the mobile device can take measurements less frequently to save battery life.

In some embodiments, other tests besides jitter can be performed to determine whether a mobile device should connect to an access point device. In some embodiments, the frame erasure rate can be employed to determine whether an access point device can provide satisfactory performance for a defined service. Accordingly, jitter, delay and/or frame erasure rate (e.g., packet loss) can be employed in different embodiments to determine the quality of service the mobile device the mobile device would experience with a particular access point device (which can provide information regarding whether the mobile device should connect to the access point device). For example, if a particular service or application can only tolerate 0.2% packet loss and when the signal strength is −83 dBm, the packet loss is higher than 0.2% (which the mobile device and the access point device can each know because the access point device can calculate the packet loss) then the mobile device will know that the signal strength for the particular access point device must be higher than −83 dBm to provide satisfactory performance for the particular service or application that can only tolerate 0.2% packet loss.

The mobile device can store the information indicating that for this particular access point device, there is signal strength −83 dBm with corresponding packet loss 0.2%. In some embodiments, the mobile device can also indicate the particular type of the mobile device. By contrast, if there is 0.1% packet loss for signal strength −82 dBm for the specific access point device, the mobile device can also store such information noting the specific access point device (e.g., an identifier for the access point device), the signal strength and the corresponding packet loss. In some embodiments, the mobile device can also indicate the particular type of the mobile device.

In some embodiments, the mobile device can evaluate the different devices and assess the signal strength at one or more different access point devices and begin to build a learning profile for each (or, in some embodiments, one or more) of the access point devices. The profile information can be stored in the access point device information repository 104 and/or be accessible by the mobile device over a network.

In another example, if the default threshold for the mobile device (which can be stored in the mobile device or otherwise accessible by the mobile device over a network) is −80 dBM then if the mobile device detects an access point signal having signal strength −80 dBM and performs the jitter test on the access point device and the jitter test fails, then the mobile device can wait until signal strength for that particular access point device becomes stronger before attempting to use the access point device for a service. For example, a stronger signal can be −75 dBM. After detecting the stronger signal, the mobile device can re-perform the jitter test for that particular access point device. If the jitter test passes (e.g., the jitter between the mobile device and access point device is equal to or less than 100 ms), the mobile device can store information indicating that signal strength of −75 dBm results in an acceptable jitter test (e.g., and/or simply replace the default threshold value with −75 dBm in the access point device information repository 104). The mobile device can then know for the future that for that particular access point device, to not attempt a voice registration/Wi-Fi call (e.g., VoWi-Fi) with that particular access point device unless the signal strength is −75 dBM or stronger.

The values provided and discussed herein are mere examples. In other embodiments, any number of other signal strength and/or jitter values can be employed and/or determined to be suitable (as such as also change with changing service levels, services and/or technologies (e.g., types of access point devices) over time) and are envisaged herein. For example, some access point devices will have low (or lower than that noted above) signal strengths but will still have jitter tests that pass. In those instances, the mobile device may still connect to the access point device for service.

In some embodiments, the mobile device can update and/or evaluate the stored information from time to time and/or based on detection of a trigger event. For example, in some embodiments, the mobile device can update and/or evaluate the stored information if the mobile device detects a new access point device or returns to a previously detected the access point device. As another example, the mobile device can update and/or evaluate the stored information based on the occurrence of an event (e.g., a call drop with a particular access point device, if the mobile device detects a signal from the access point device indicating an update in software of the access point device, after a defined amount of time has passed since the previous update and/or evaluation of the particular access point device, based on time of day, day of week and/or month of year, based on typical traffic conditions at different times of day, day of week and/or months of year of the access point device or the like).

In some embodiments, the first time a mobile device is brought to a defined location (e.g., an employment location for a user of the mobile device), the mobile device can do a jitter test on the access point device serving the employment location. The next time the mobile device comes back to the employment location, the jitter test can be performed again if the signal strength is below a passing jitter test previously conducted at the employment location.

In some embodiments, the signal strength can change from time to time because a new access point device can replace an access point device for which a previous signal strength and jitter test was performed. In this embodiment, the new access point device may or may not pass the jitter test.

In some embodiments, a new access point device can be added at a location in addition to a previous access point device continuing to be within vicinity of the new access point device. Accordingly, in some embodiments, the previously existing access point device can have a different jitter test result than previously measured by the mobile device based on the presence of the new access point device.

Accordingly, in some embodiments, the database will have a list of access point devices and also an indication of whether the mobile device is registered with the access point devices and/or whether the access point device is open or closed. In some embodiments, fields are provided in the access point device information repository 104 to include information such as signal strength where the access point device is capable of supporting a particular application (e.g., voice, etc.). Accordingly, there can be a different signal strength for each or for one or more different applications. In some embodiments, each mobile device can maintain and/or update this list (which can be locally stored at the mobile device and/or accessed by the mobile device over a network) from time to time as the mobile device moves from one access point device to another access point device (as shown in FIG. 3D), which can be a Wi-Fi access point device signal strength threshold list table. As shown in FIG. 3C, the threshold can start with −80 dBM as the initial threshold and over time the dBM value can change as the jitter test reveals the right signal strength thresholds (as shown in FIG. 3D).

In some instances, although the embodiments described herein are detailing Wi-Fi services, in other embodiments, any number of different types of services can be facilitated via jitter and signal strength assessments. By way of example, but not limitation, the service can be satellite. In some other embodiments, the service can be video application. For example, with satellite service, the mobile device can use the information associated with the access point device information repository 104 to determine which access point device to connect to of the possible access point devices.

IoT devices can be one example of a mobile device that can be employed in the embodiments described herein. For example, in some embodiments, a mobile device can stream content over a cellular network and the mobile device can be in motion at the time of the streaming (the user of the mobile device is walking, running, driving, flying or otherwise moving from one location to another). The mobile device can enter a region in which satellite communication can be detected and/or accessed by the mobile device. Because streaming over the cellular network can be inefficient, the mobile device can connect to the satellite communication to continue streaming. The mobile device can perform the jitter test (or, for example, the frame erasure test) as described herein to determine whether the streaming service would be successfully facilitated via the satellite. Accordingly, in lieu of streaming from a content distribution node (CDN), the mobile device can stream via a satellite. In some embodiments, in lieu of streaming from a CDN in a cloud network, the mobile device can stream from a CDN in another network.

Yet another service that can be facilitated with the embodiments described herein can include chatty service. As used herein, chatty service can be or include Internet of Things (IoT) service. In one example, one or more shipping containers can be located in an area and the IoT device can be employed to determine where the shipping containers are located and where are the delivery vehicles carrying the shipping containers are located. Wirelessly accessing RFID connections (if the shipping containers and/or trucks include RFID tags) can be expensive. Accordingly, it can be less expensive to access another network, via an access point device, at the location at which the delivery of the shipping containers is taking place.

The shipping containers, for example, can have an RFID tag, for each shipping container. The RFID tags can be scanned as the shipping containers are removed from the delivery vehicle and therefore leave the truck inventory and become part of the store inventory. This is a time-sensitive application because they typically have to be synchronized with one another—the delivery vehicle inventory is decreasing as the store inventory is increasing. The cellular network can be an expensive system for communication of such inventory information. Accordingly, one or more embodiments can provide a least cost approach to sending the information. The mobile device at or in the delivery vehicle can measure the jitter between the mobile device and the store access point device. If the jitter is acceptable for the RFID scanning service (e.g., if the jitter test results in a jitter value that is acceptable for the RFID scanning service), the mobile device can connect to the store access point device and conduct communication over the store access point device in lieu of employing cellular service. Numerous different store deliveries can be communicated via this approach in lieu of using cellular service. A separate access point device information repository can be built for each store access point device visited by the delivery vehicle (e.g., visited by the mobile device). Accordingly, embodiments described herein can range from Wi-Fi calling applications to IOT applications. The information can be received and the mobile device can know the signal strength value and whether there is Wi-Fi at a particular delivery location, for example, and can build the access point device profile for other delivery trucks going to those stores. In a connected car application, information can be obtained and the mobile device can evaluate associated events based on receipt of the delivery vehicle information and can provide the information to other trucks and/or other cars doing deliveries.

In some embodiments, if there are dynamic load conditions, the network can be updated on a per user basis on a per time basis. For example, for a given transmission time interval (TTI) (e.g., 2 ms) because a particular mobile device only goes through a particular area at a certain time, the mobile device could begin to modify the parameters. As such, in some embodiments, the system can send a static set of parameters (e.g., information indicating that the mobile device should join a particular access point device for Wi-Fi calling at signal strength greater than or equal to −80 dBM and leave a particular access point device for Wi-Fi calling at signal strength less than −80 dBM (e.g., at −81 dBM)). The mobile device can then modify the parameter values when or after the mobile device actually goes through the area with the access point device thereby detecting the signal strength and being able to perform a jitter test with the access point device. In this manner, the mobile device can also include time information associated with the parameters. As such, the access point device a mobile device is connected to for a service is not only depending on the access point device (e.g., the channel of the access point device) but for the same access point device, can differ depending on the time that the mobile device is within the proximity of the access point device.

Accordingly, the mobile device can include the access point device the mobile device is connected to and also the time that the mobile device is on the access point device. With Wi-Fi, the frequency selection can be a default value from the setup configuration in the mobile device when purchased.

In some embodiments, the access point device information repository 104 can store information for two different frequencies for the same access point device. For example, one access point device can have a first frequency (e.g., 5 Gigabytes) and a second frequency (e.g., 2.4 Gigabytes). One of the frequencies may have good bandwidth and signal strength and the other frequencies may have weaker bandwidth and better signal strength. In other embodiments, all different permutations of bandwidth, signal strength, jitter can be provided across the different frequencies. As such, different rows of frequencies can include different information for the same access point device. The frequencies can represent Wi-Fi frequencies by showing some access point devices with multiple rows for the multiple frequencies and with the same SSID. The 2.4 Gigabyte frequency could have one row and the 5 Gigabyte frequency could have another row.

In some embodiments, since access point devices can have associated relays that shift and boost signals from the access point devices (which shifting results in jitter), the access point device information repository can include separate information for the access point device and for the relay. As such, when the mobile device is connected to the relay, there can be one profile (resultant from the mobile device performing a jitter test with the relay) and one jitter and signal strength result. This information could differ from the information for the access point device itself. As such, even in case in which the access point device and the repeater for the access point device are operating on the same frequency, there could be different signal strength and jitter performance recorded by the mobile device as between the two different devices.

The device has a default signal strength programmed for Wi-Fi (e.g., −80 dBM). In one or more embodiments, the mobile device can tune signal strength thresholds for different services (e.g., voice calling). In order to build the intelligence about the selection between different access point devices, the mobile device can first collect the history of relationships between signal strength and jitter for one or more access point devices the mobile device experiences. Accordingly, the mobile device can visit different access point devices (which each have unique identifiers) and, based on that relationship between signal strength and jitter, the mobile device can determine whether the mobile device should try to make Wi-Fi voice calls at −80 dBM with a particular access point device or whether the mobile device should try to wait for better signal strength (e.g., −60 dBM) before connecting to the particular access point device.

In various embodiments, any of a number of different services (e.g., jitter-sensitive services) can be employed. For example, jitter-sensitive services such as push to talk can be facilitated. Push to talk can be a very important application because Wi-Fi is a requirement for emergencies in some countries (e.g., there is a requirement to be able to use Wi-Fi for communication if cellular is over capacity). Other services can be voice and video (e.g., especially live streaming video).

As the signal gets stronger, the likelihood that the mobile device will stay connected to the access point device can increase (and/or the mobile device can stay connected to the access point device for a longer duration of time). By contrast, as the signal gets weaker, the likelihood that the mobile device will stay connected to the access point device can decrease (and/or the mobile device can stay connected to the access point device for a shorter duration of time and move to another access point device faster than cases in which the signal is getting stronger).

In some embodiments, the mobile device can wait 10 dBm longer to register voice calling if there is a need for more signal strength and as the mobile device get closer to the door and further away from the access point device, the mobile device can leave 10 dBm sooner and go to another access point device. As used herein, waiting "10 dBm" longer can mean staying connected to the access point device while the signal strength decreases 10 dBm from a defined level.

In some embodiments, there is a component and/or application in the mobile device that would take the parameters (e.g., default signal strength for joining Wi-Fi). The component and/or application can go into the list that is part of the access point device information repository and change the default value that the mobile device is programmed with that then gets modified in the mobile device itself for each access point device (or, one or more access point devices). The actual values stored in or accessible by the mobile device can be changed and/or updated with the component and/or application. This information can be dynamically modified.

As the mobile device is deploying Wi-Fi calling (e.g., VoWi-Fi), the mobile device can make a determination as to whether to connect to the radio access network (RAN) or to connect to Wi-Fi (e.g., which is a connection to a local access point device).

In some embodiments, the mobile device will not move from the access point device too soon because the risk of having multiple movements between different access point devices then increases. By contrast, there are edge cases in which the mobile device is in a particular location and the RAN begins deteriorating, however, even if the mobile device moves to an access point device and tries to provide or continue a Wi-Fi call, because other mobile device activity with the same access point device (e.g., perhaps a number of mobile devices are streaming video via the access point device) there may still be no space for a voice call.

In some embodiments, the mobile device can build and/or store metrics for a particular access point device, access point device level, region level (e.g., within the Atlanta region) and/or user-specific level. There can be a profile for the mobile device user and/or for the type of the mobile device.

One or more embodiments can enable a mobile device (e.g., mobile device 102) of the system 100, 100A, 100B to perform one or more of three functions: recognize signal strength (e.g., RSSI) and/or jitter mismatch, (2) adjust signal strength threshold, and/or (3) recheck new signal strength threshold for jitter. As described herein, signal strength (or signal strength threshold) and jitter mismatch means that the jitter and signal strength combination for a defined access point device cannot sufficiently provide for the desired service (e.g., the jitter may be too great for example).

In some embodiments, recognizing signal strength threshold and/or jitter mismatch can be performed as follows. According to one implementation, the signal strength of an access point device can be evaluated before the access point device is chosen for voice use (e.g., VoWi-Fi). The jitter between the mobile device and an access point device can also be evaluated (e.g., via automated mobile device testing or via ping messages as described with reference to FIGS. 1A, 1B and 1C) before the access point device is chosen for jitter-sensitive services like VoWi-Fi. The initial or default signal strength threshold (for example −75 dBm) for a mobile device to select an access point device for VoWi-Fi service can be preconfigured in the mobile device for one or more newly detected access point devices that can provide Wi-Fi service. For example, in some embodiments, the preconfigured mobile device information can be as shown in FIG. 3C. These values can show an access point device list with initial default thresholds stored at (or otherwise accessible via a network by) a mobile device (e.g., mobile device 102). The list can be updated using the methods described herein, which can result in an updated list as shown in FIG. 3D.

FIGS. 5A, 5B, 5C, 5D, 5E and 5F illustrate example, non-limiting diagrams of systems for which mobile device self-optimizing technology selection thresholds can be employed in accordance with one or more embodiments described herein. Repetitive description of like elements employed in other embodiments described herein is omitted for sake of brevity.

In some embodiments, the initial signal strength selection threshold, for a service (e.g., Wi-Fi), for example, can be defined to match the typical relationship between acceptable signal strength and acceptable jitter to accommodate the VoWi-Fi service. For example jitter for an access point device that provides Wi-Fi service typically increases beyond 100 milliseconds (ms) when the signal strength for the access point device is below −75 dBm, so −75 dBm can be set as the logical starting point for the selection threshold (e.g., the threshold to select an access point device to provide Wi-Fi service). This scenario is illustrated in FIG. 5A.

Figure 5A:
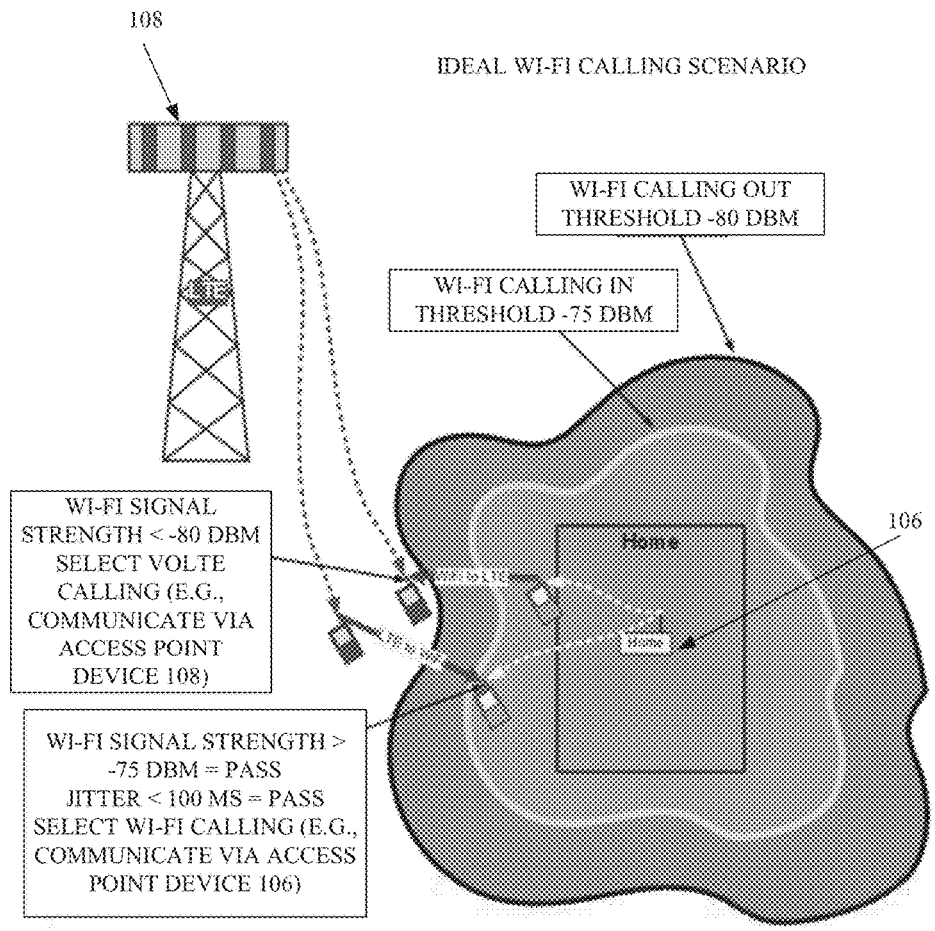
FIGS. 5A, 5B, 5C, 5D, 5E and 5F illustrate example, non-limiting diagrams of systems for which mobile device self-optimizing technology selection thresholds can be employed in accordance with one or more embodiments described herein.

As shown in the FIG. 5A, for example, the dotted lines coming from the LTE base station indicate coverage from a particular technology at the particular location/time. The solid lines (with "LTE to WiFi" and "Wifi to LTE" markers on them) indication the direction of travel/mobility.

For clarification, it is noted that the four mobile devices shown in the drawing are indicative of a single mobile device over time (e.g., mobile device 102).

As mentioned previously, jitter of an access point device that provides Wi-Fi service (e.g., access point device 106) can be impacted by a number of external factors, some of which are location-specific and/or time-specific. For example, the particular time at which the access point device is accessed can dictate the jitter for the access point device. As another example, the location (e.g., proximity to another access point device and/or to high traffic areas) can dictate the jitter for the access point device.

Figure 5B:
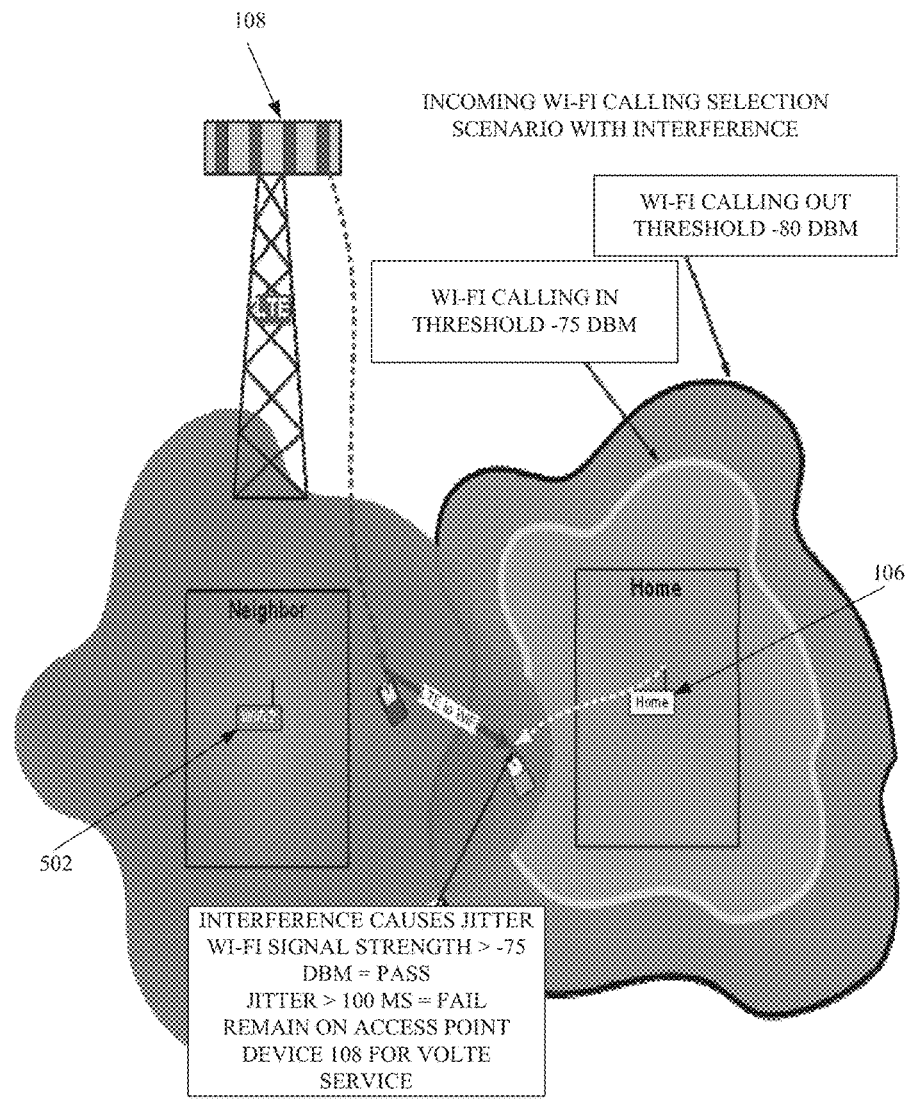

There will be cases (e.g., signal strength threshold/jitter mismatch scenarios) in which the signal strength of the access point device that provides the Wi-Fi service is greater than the signal selection threshold yet jitter is beyond 100 ms, for example. In some of these signal strength threshold jitter mismatch embodiments, the mobile device will not select VoWi-Fi, and will instead remain registered for VoLTE (voice over LTE), as shown in FIG. 5B. As described above, VoWi-Fi and VoLTE are provided as mere examples and any number of different types of communication protocols can be employed at the different access point devices. As described above with reference to FIGS. 1A, 1B, 1C, the term "access point device" is intended to encompass any device (e.g., Wi-Fi access point device, base station device providing cellular service, RFID scanning devices or the like) that can facilitate communication with the mobile device including, but not limited to, RFID communication protocols, LTE, Internet of Things (IoT) protocols, and the like.

In some cases, the mobile device can continue to use the access point device 106 that provides Wi-Fi for communication of best-effort services (e.g., Internet browsing) while employing the access point device 108 that provides LTE service (e.g., access point 108) for jitter-sensitive services if access point device 108 is deemed inadequate for voice services.

Another function that can be performed by the mobile device 102 and/or system 100, 100A, 100B can be adjustment of VoWi-Fi selection signal strength threshold. The signal strength threshold jitter mismatch described above can be an indication that the access point device 106 has atypical impairment. In this case, the default Wi-Fi selection thresholds cannot adequately protect the VoWi-Fi subscriber from a poor voice experience on the specific Wi-Fi access point device. In this case, the mobile device 102 can reset the VoWi-Fi selection signal strength threshold.

Figure 5C:
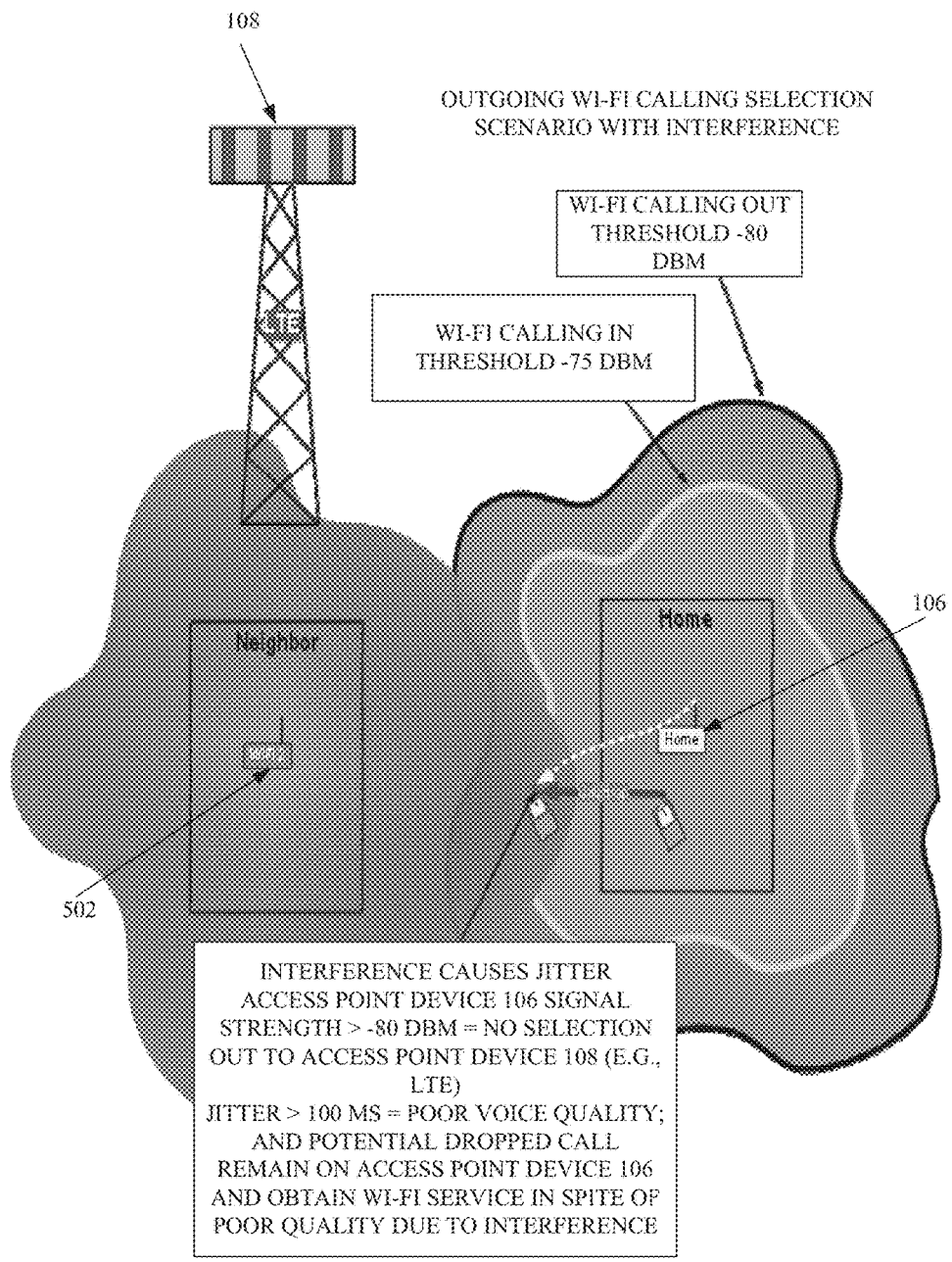
Figure 5D:
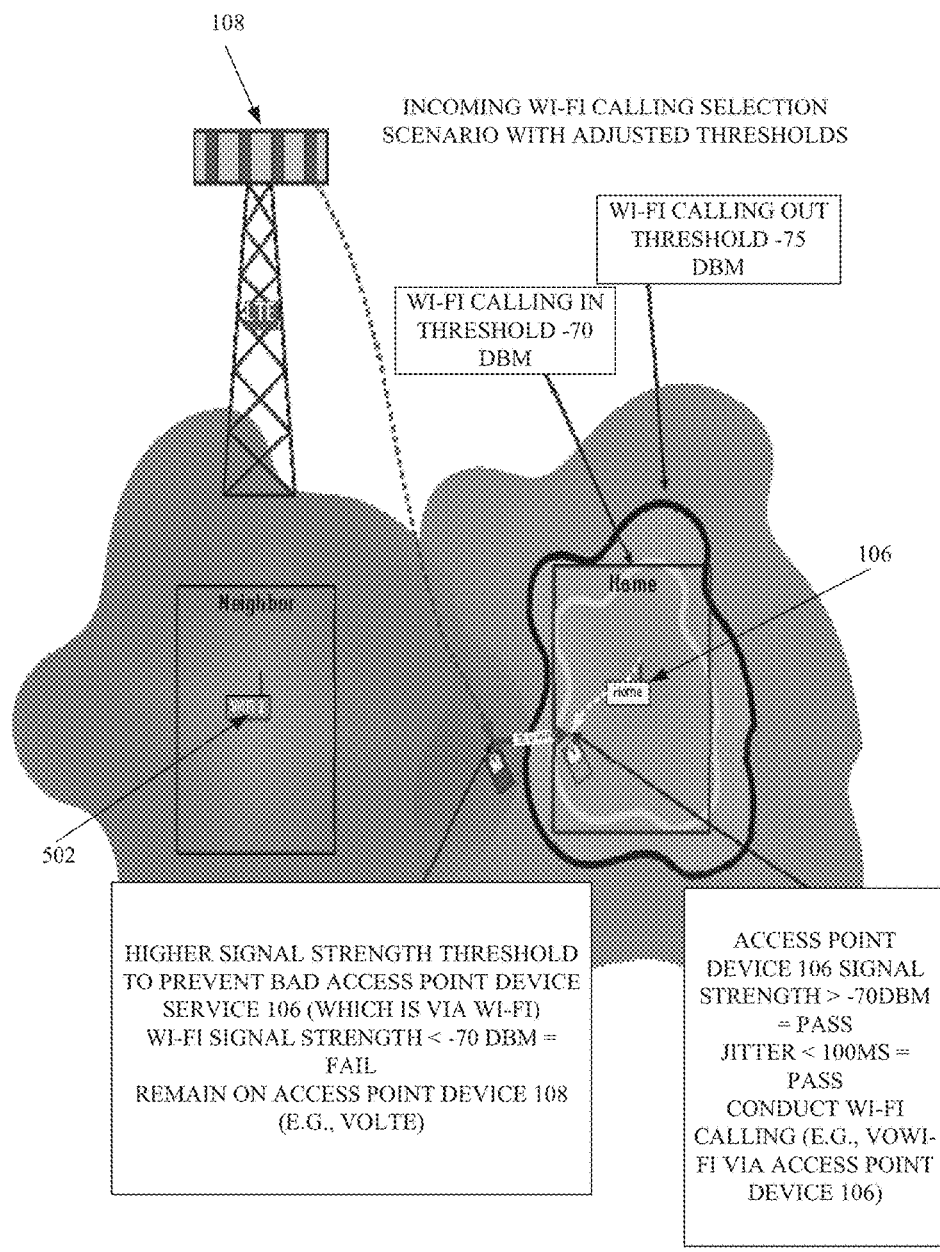
Figure 5E:
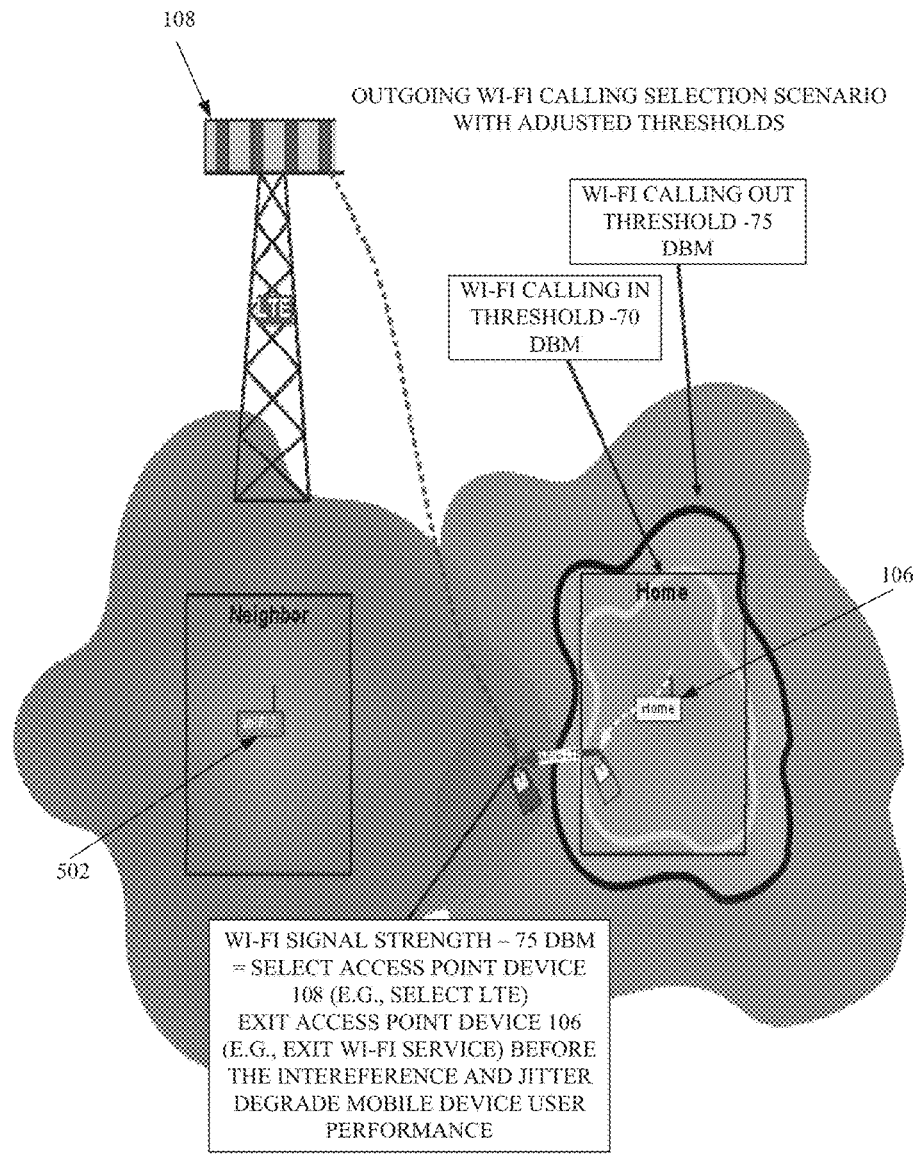

First, the mobile device 102 can store the signal strength at which jitter was detected above 100 ms as information indicating signal strength bad jitter. This scenario can be as illustrated in FIGS. 5B and 5C. The mobile device 102 can reset the new access point device-specific VoWi-Fi signal strength threshold. Such can be adjusted to equal signal strength bad jitter plus a signal strength margin value. For example, if bad jitter was detected at −75 dBm signal strength and the signal strength margin is 5 dB then a new VoWi-Fi signal strength selection threshold can be set to −70 dBm. This scenario is illustrated in FIGS. 5D and 5E.

Figure 5F:
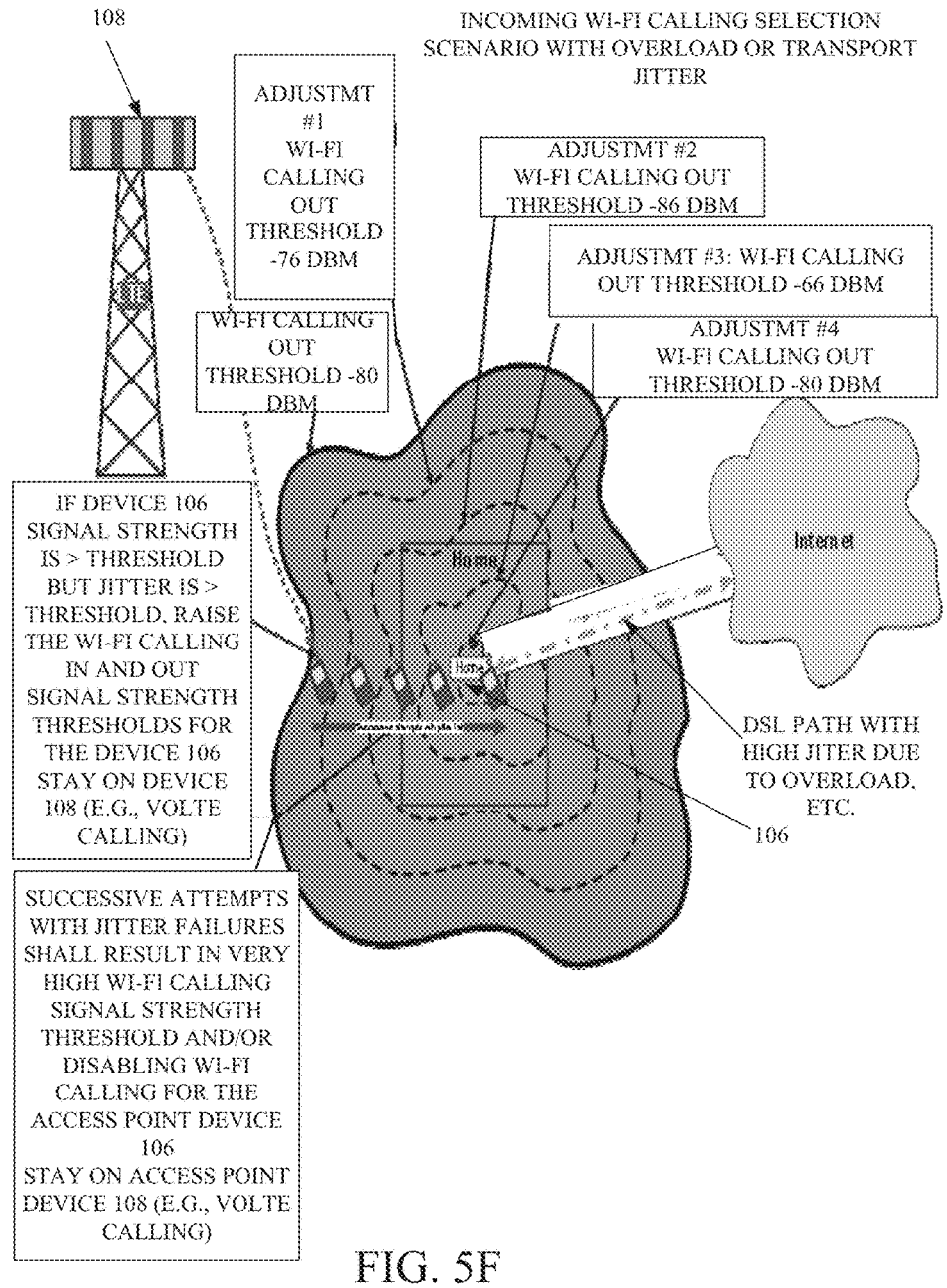

In some embodiments, another function that can be performed by the mobile device 102 and/or the system 100, 100A, 100B can be recheck of new signal strength for jitter. Interference is typically location-specific, and therefore may improve as the mobile device 102 gets closer to an access point device. Following the prior example, the mobile device 102 can measure jitter again after the signal strength of the access point device 106 increases beyond −70 dBm (e.g., the new VoWi-Fi signal strength selection threshold for this access point device 106). If the jitter at −70 dBm is less than 100 ms, the mobile device 106 can use VoWi-Fi. This is illustrated in FIG. 5F.

If the jitter at −70 dBm signal strength is still greater than 100 ms, the mobile device can reset a new VoWi-Fi signal strength selection threshold that is 5 dB higher. This cycle can repeat until the mobile device finds an appropriate signal strength for which jitter is less than 100 ms. If the cause of jitter is overload of the Wi-Fi radio or transport (DSL) resources, jitter will likely exceed 100 ms at any Wi-Fi signal strength. In this case, the VoWi-Fi signal strength selection threshold can get successively higher until the access point device is effectively blocked from VoWi-Fi use. This is illustrated in FIG. 5F.

Figure 5G:
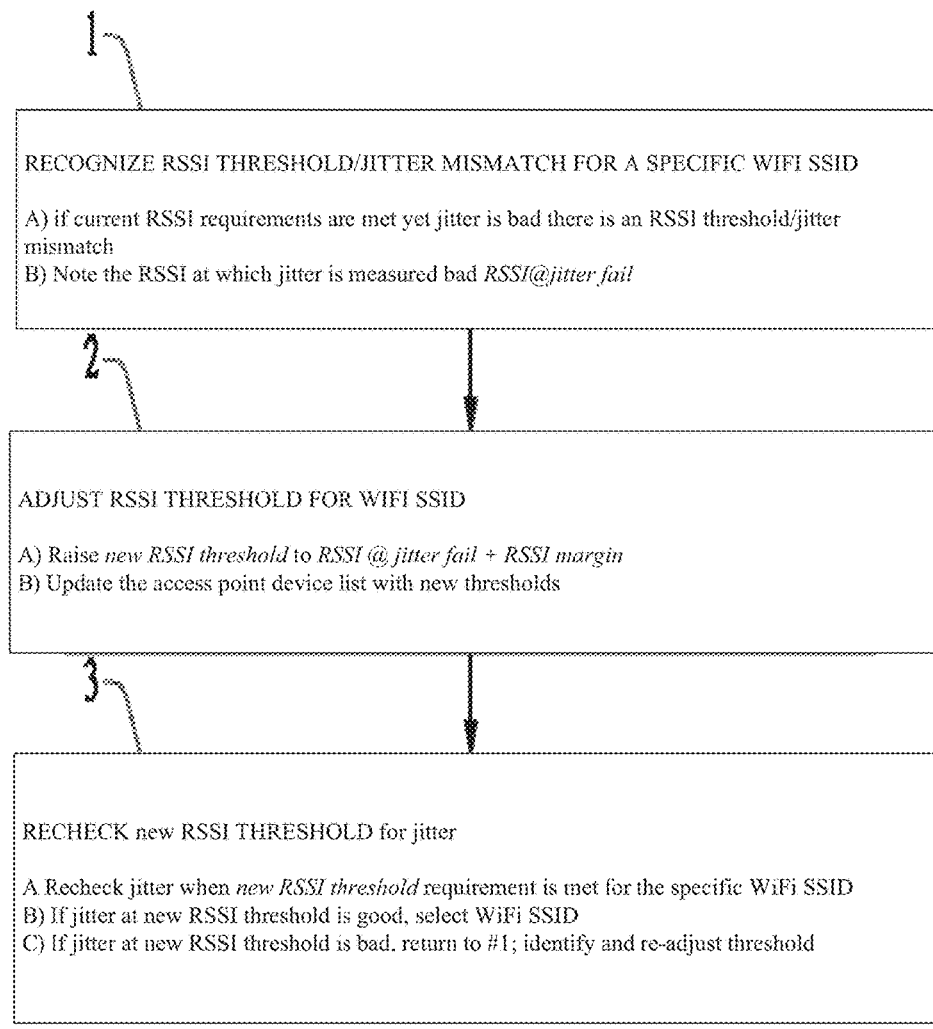
FIGS. 5G, 6, 7, 8, 9, 10, 11 and 12 illustrate flowcharts of methods that facilitate mobile device self-optimizing technology selection thresholds in accordance with one or more embodiments described herein.

The flow between recognition of signal strength jitter mismatch, adjustment of signal strength threshold for Wi-Fi SSID and recheck of new signal strength for jitter can be as illustrated in FIG. 5G. While the term "RSSI" is employed, the embodiment can be expanded to indicate any type of signal strength measurement and so the embodiments are not limited to RSSI measurements.

Turning back to FIGS. 1A, 1B, 1C, 2, 3A, 3B, 3C, 3D and 4, one or more embodiments can enable a mobile device 102 to stay on the network when there exists an access point device (e.g., access point device 106) within the boundaries of the area in which the mobile device 102 is located. One or more embodiments can enable the user of the mobile device 102 to have the same experience on Wi-Fi (e.g., on access point device 106) as the user of the mobile device 102 has had on the cellular network (e.g., on access point device 106, which can be an LTE base station device, for example, as shown in FIGS. 5A, 5B, 5C, 5D, 5E and/or 5F). As such, the transition from the voice cellular call to the VoWi-Fi call can be seamless.

FIGS. 6, 7, 8, 9, 10, 11 and 12 illustrate flowcharts of methods that facilitate mobile device self-optimizing technology selection thresholds in accordance with one or more embodiments described herein. Repetitive description of like elements employed in other embodiments described herein is omitted for sake of brevity.

Figure 6:
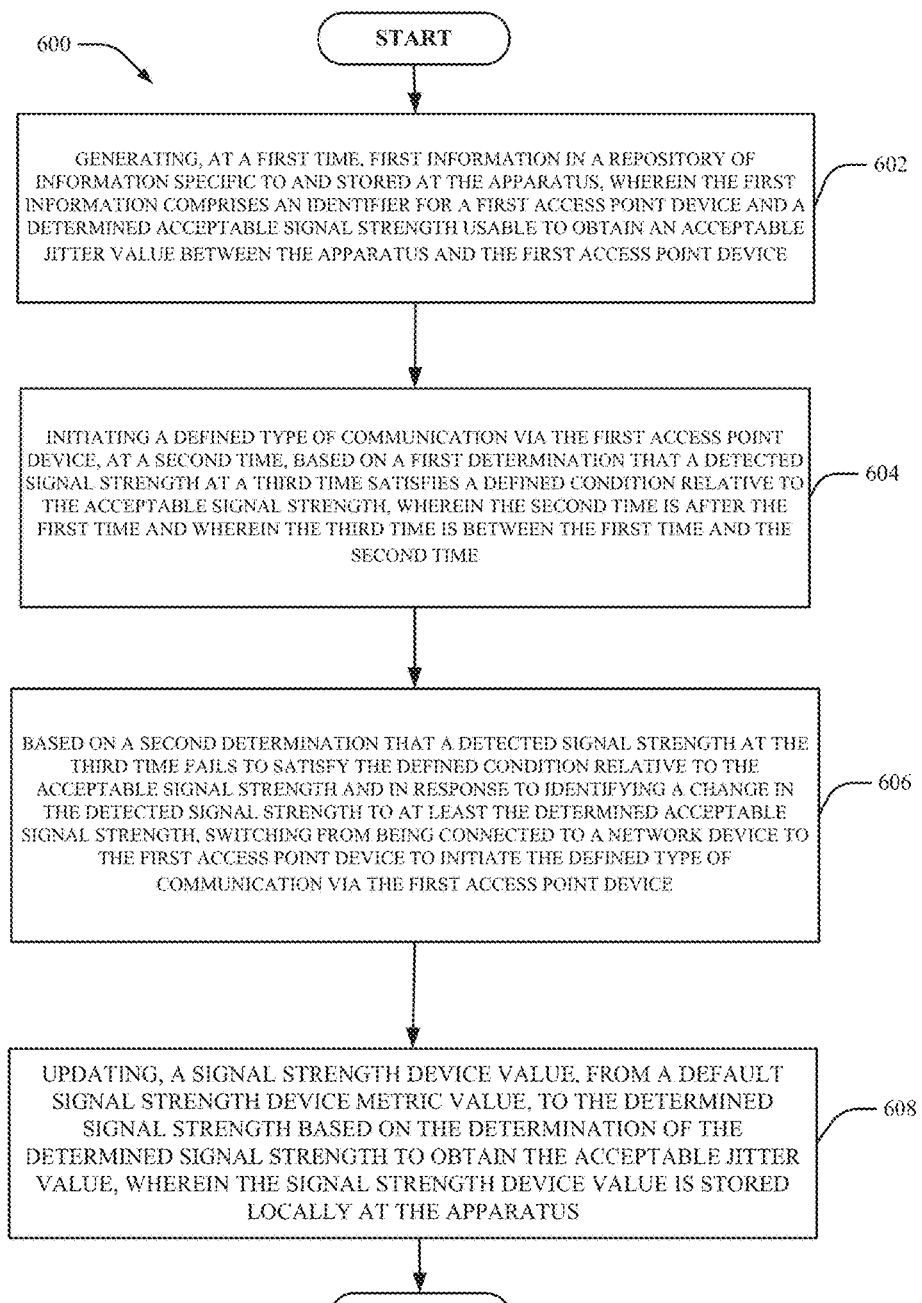

Turning first to FIG. 6, at 602, method 600 can generating, at a first time, first information in a repository of information specific to and stored at the apparatus, wherein the first information comprises an identifier for a first access point device and a determined acceptable signal strength usable to obtain an acceptable jitter value between the apparatus and the first access point device. At 604, method 600 can comprise initiating a defined type of communication via the first access point device, at a second time, based on a first determination that a detected signal strength at a third time satisfies a defined condition relative to the acceptable signal strength, wherein the second time is after the first time and wherein the third time is between the first time and the second time.

At 606, method 600 can comprise based on a second determination that a detected signal strength at the third time fails to satisfy the defined condition relative to the acceptable signal strength and in response to identifying a change in the detected signal strength to at least the determined acceptable signal strength, switching from being connected to a network device to the first access point device to initiate the defined type of communication via the first access point device.

At 608, method 600 can also comprise updating a signal strength device value from a default signal strength device metric value to the determined acceptable signal strength to proceed to obtain the acceptable jitter value, and wherein the signal strength device value is stored locally at the apparatus.

Figure 7:
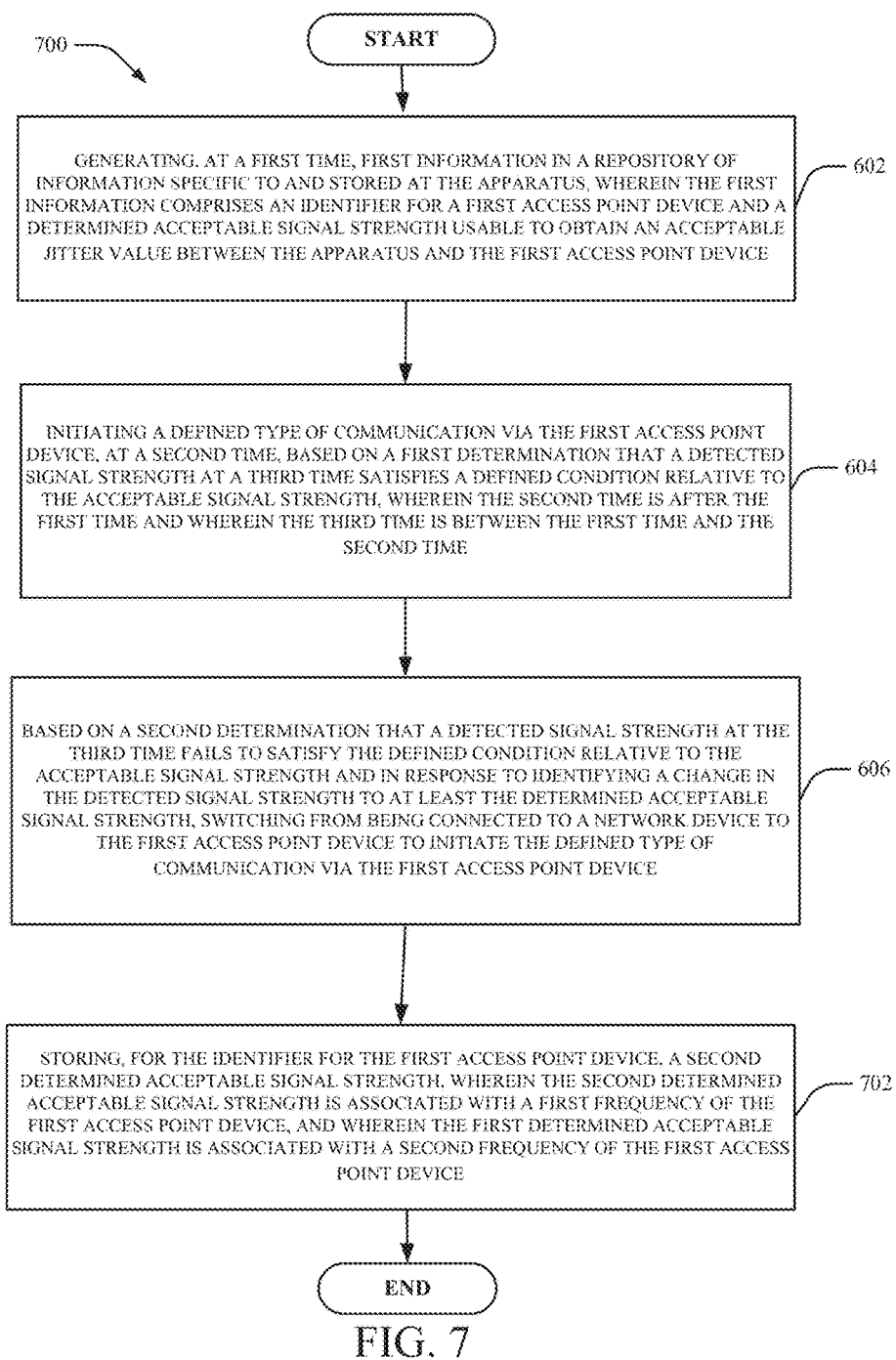

Turning now to FIG. 7, method 700 can include steps 602, 604, 606 of method 600. Further, in some embodiments, at 702, method 700 can comprise storing, for the identifier for the first access point device, a second determined acceptable signal strength, wherein the second determined acceptable signal strength is associated with a first frequency of the first access point device, and wherein the first determined acceptable signal strength is associated with a second frequency of the first access point device.

Figure 8:
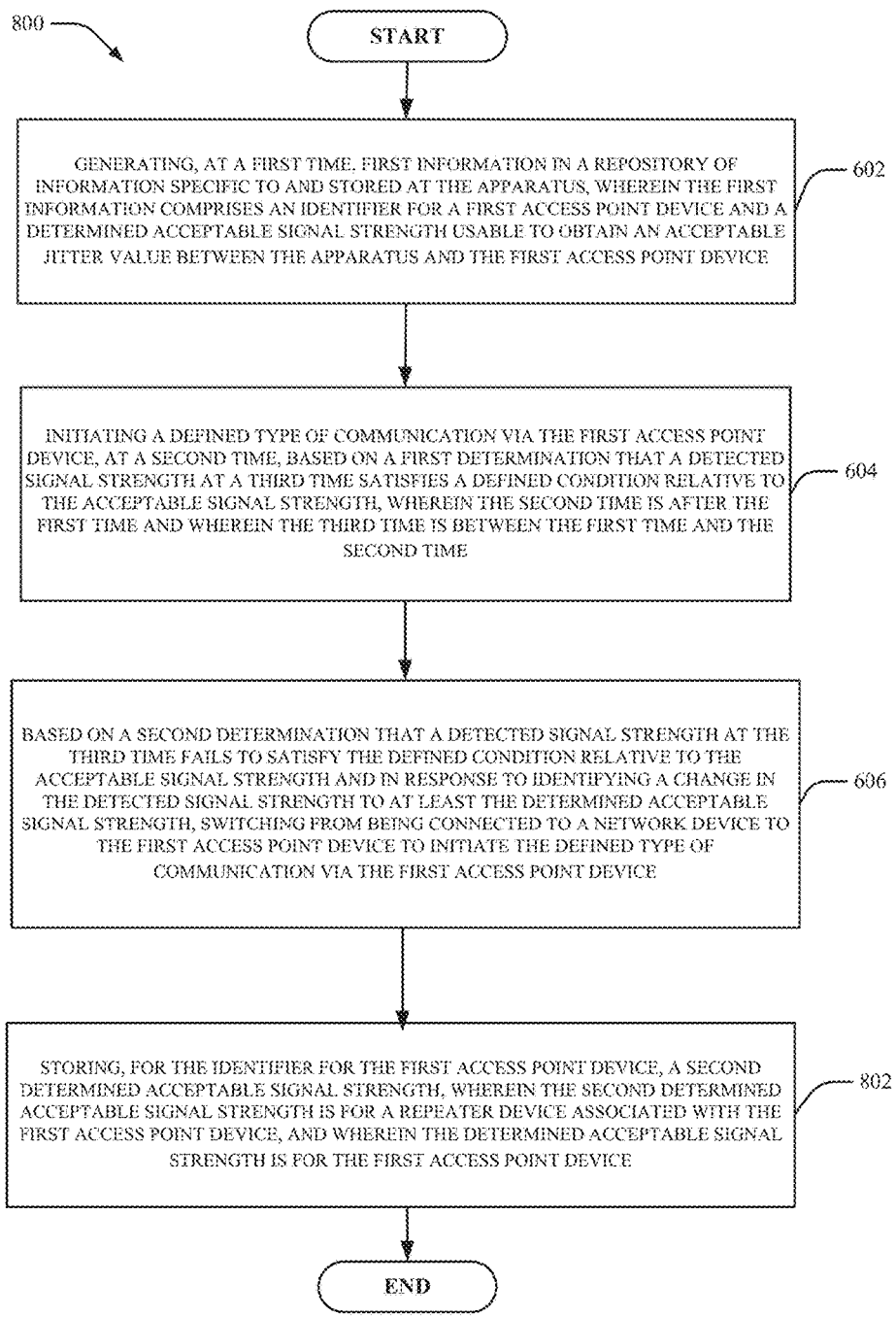

Turning now to FIG. 8, method 800 can include steps 602, 604, 606 of method 600. Further, in some embodiments, at 802, method 800 can comprise storing, for the identifier for the first access point device, a second determined acceptable signal strength, wherein the second determined acceptable signal strength is for a repeater device associated with the first access point device, and wherein the determined acceptable signal strength is for the first access point device.

Figure 9:
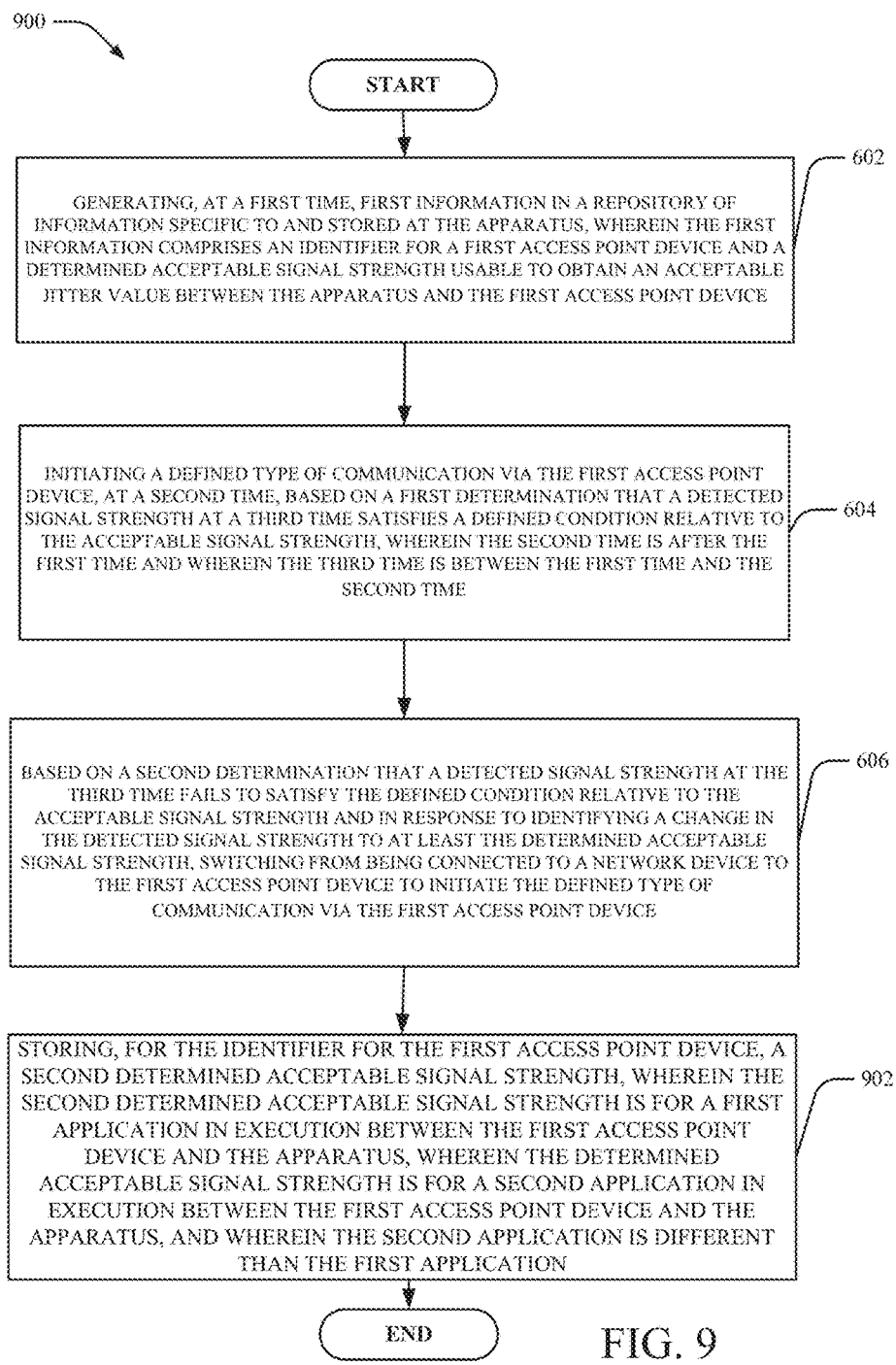

Turning now to FIG. 9, method 900 can include steps 602, 604, 606 of method 600. Further, in some embodiments, at 902, method 900 can comprise storing, for the identifier for the first access point device, a second determined acceptable signal strength, wherein the second determined acceptable signal strength is for a first application in execution between the first access point device and the apparatus, wherein the determined acceptable signal strength is for a second application in execution between the first access point device and the apparatus, and wherein the second application is different than the first application.

In some embodiments, the first application comprises a wireless fidelity voice application. In some embodiments, the second application comprises an internet of things application. In some embodiments, the first application comprises a cellular application, wherein the apparatus comprises an apparatus associated with a delivery vehicle, wherein the internet of things application tracks a delivery of merchandise from the delivery vehicle to a retail location having the first access point device, and wherein the apparatus initiating the defined type of communication via the first access point device comprises the apparatus switching to the cellular application from a radio frequency identification network to the cellular network.

In some embodiments, the second application comprises a cellular application, and wherein the apparatus initiating the defined type of communication via the first access point device comprises the apparatus switching to from a cellular network to the wireless fidelity voice application for a voice call.

Figure 10:
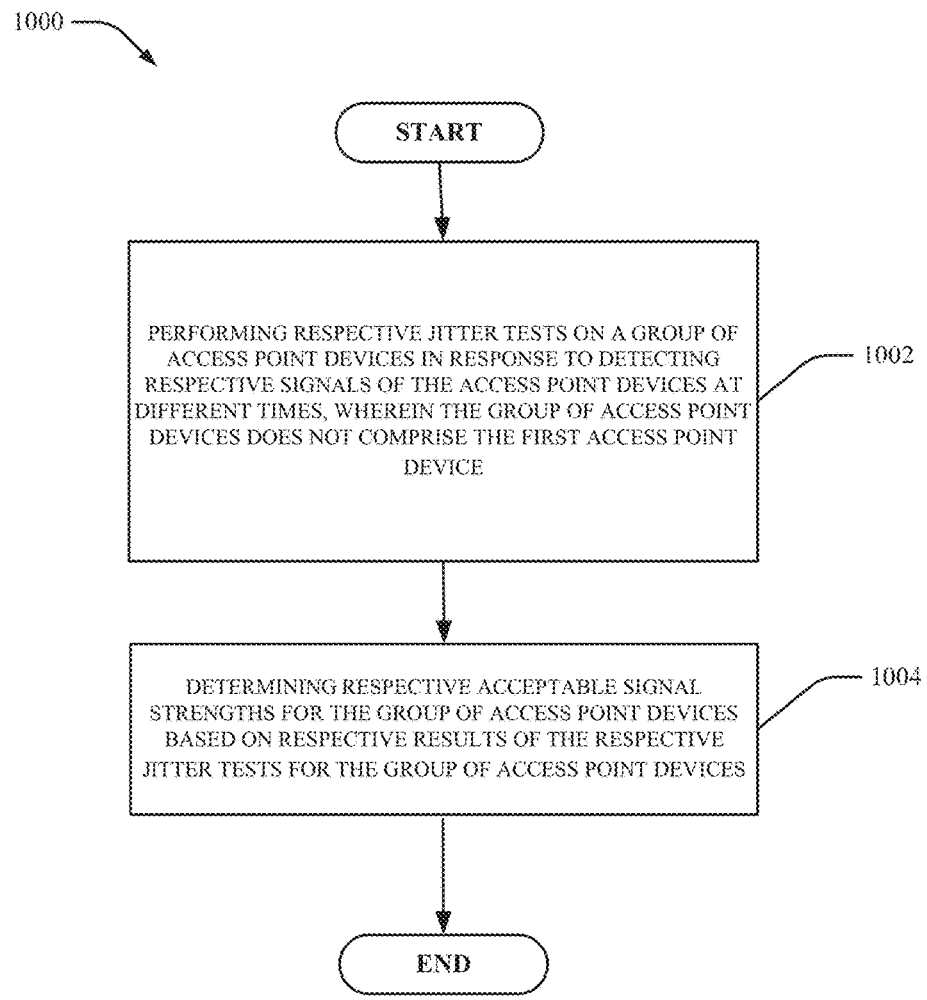

Turning now to FIG. 10, at 1002, method 1000 can comprise performing respective jitter tests on a group of access point devices in response to detecting respective signals of the access point devices at different times, wherein the group of access point devices does not comprise the first access point device. At 1004, method 1000 can comprise determining respective acceptable signal strengths for the group of access point devices based on respective results of the respective jitter tests for the group of access point devices.

In some embodiments, although not shown, method 1000 also comprises storing in the repository of information a plurality of identifiers for the respective plurality of access point devices and the respective plurality of determined acceptable signal strengths to obtain a respective plurality of acceptable jitter values between the apparatus and the respective plurality of access point devices.

Figure 11:
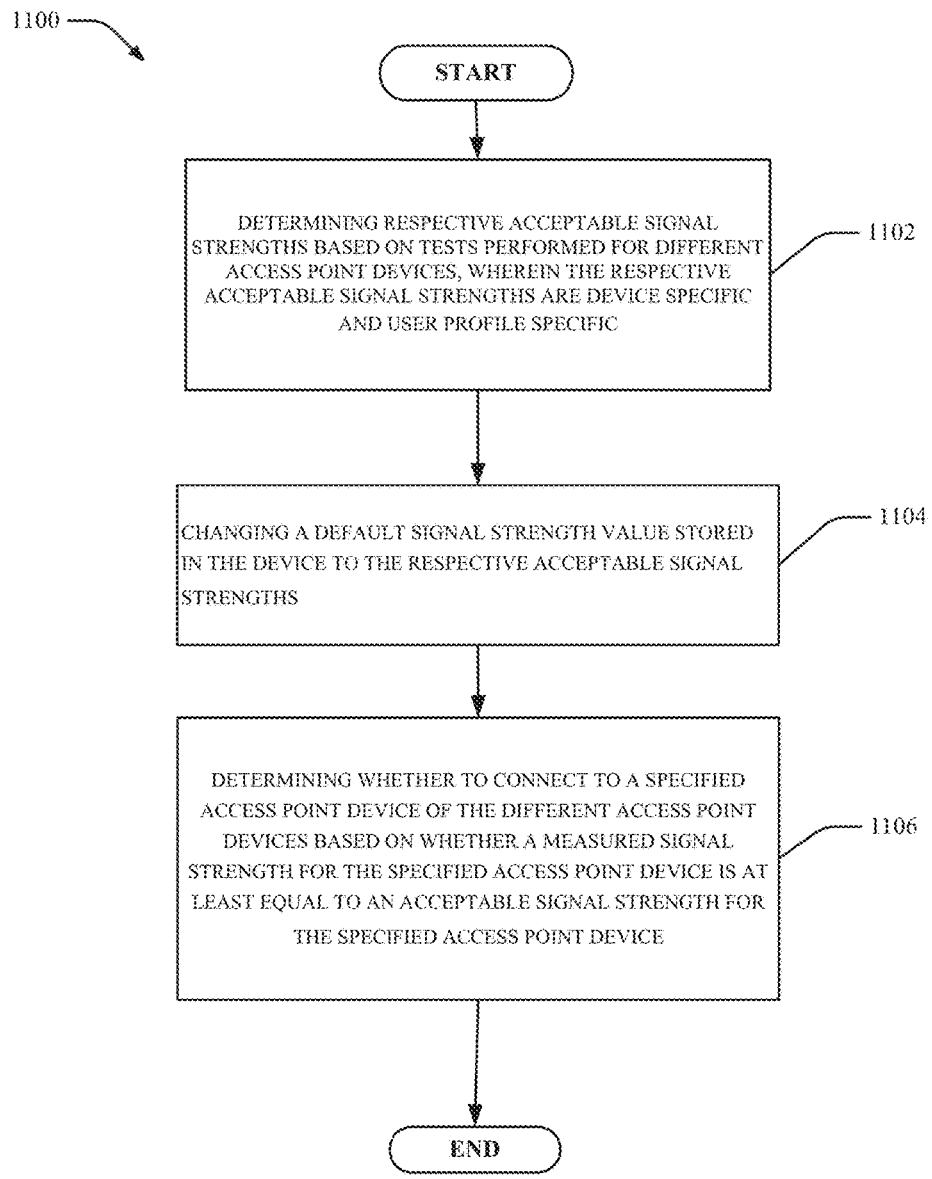

Turning now to FIG. 11, at 1102, method 1100 can comprise determining respective acceptable signal strengths based on tests performed for different access point devices, wherein the respective acceptable signal strengths are device specific and user profile specific. At 1104, method 1100 can comprise changing a default signal strength value stored in the device to the respective acceptable signal strengths.

At 1106, method 1100 can comprise determining whether to connect to a specified access point device of the different access point devices based on whether a measured signal strength for the specified access point device is at least equal to an acceptable signal strength for the specified access point device.

Figure 12:
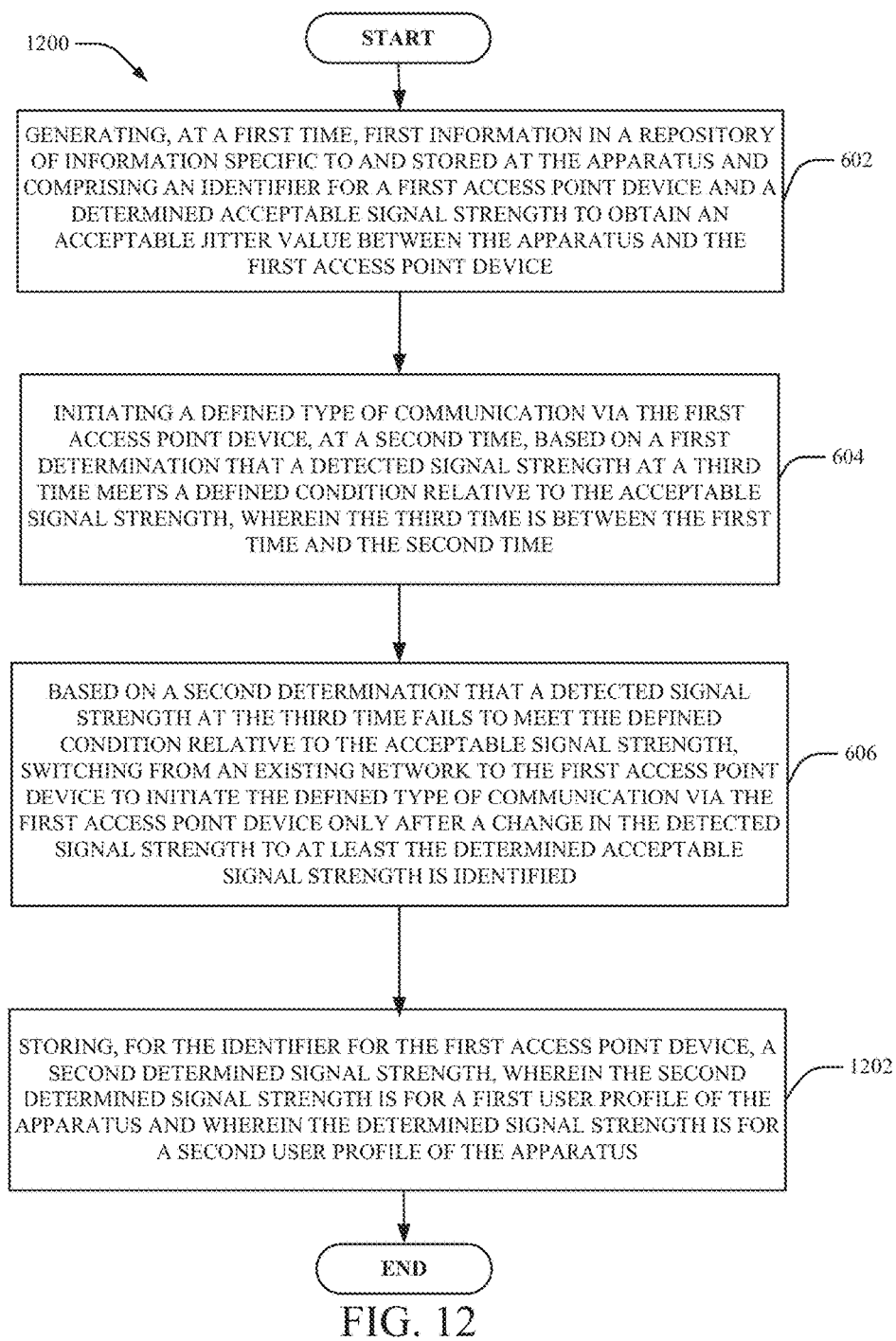

Turning now to FIG. 12, method 1200 can include steps 602, 604, 606 of method 600. Further, in some embodiments, at 1202, method 1200 can comprise storing, for the identifier for the first access point device, a second determined signal strength, wherein the second determined signal strength is for a first user profile of the apparatus and wherein the determined signal strength is for a second user profile of the apparatus.

Figure 13:
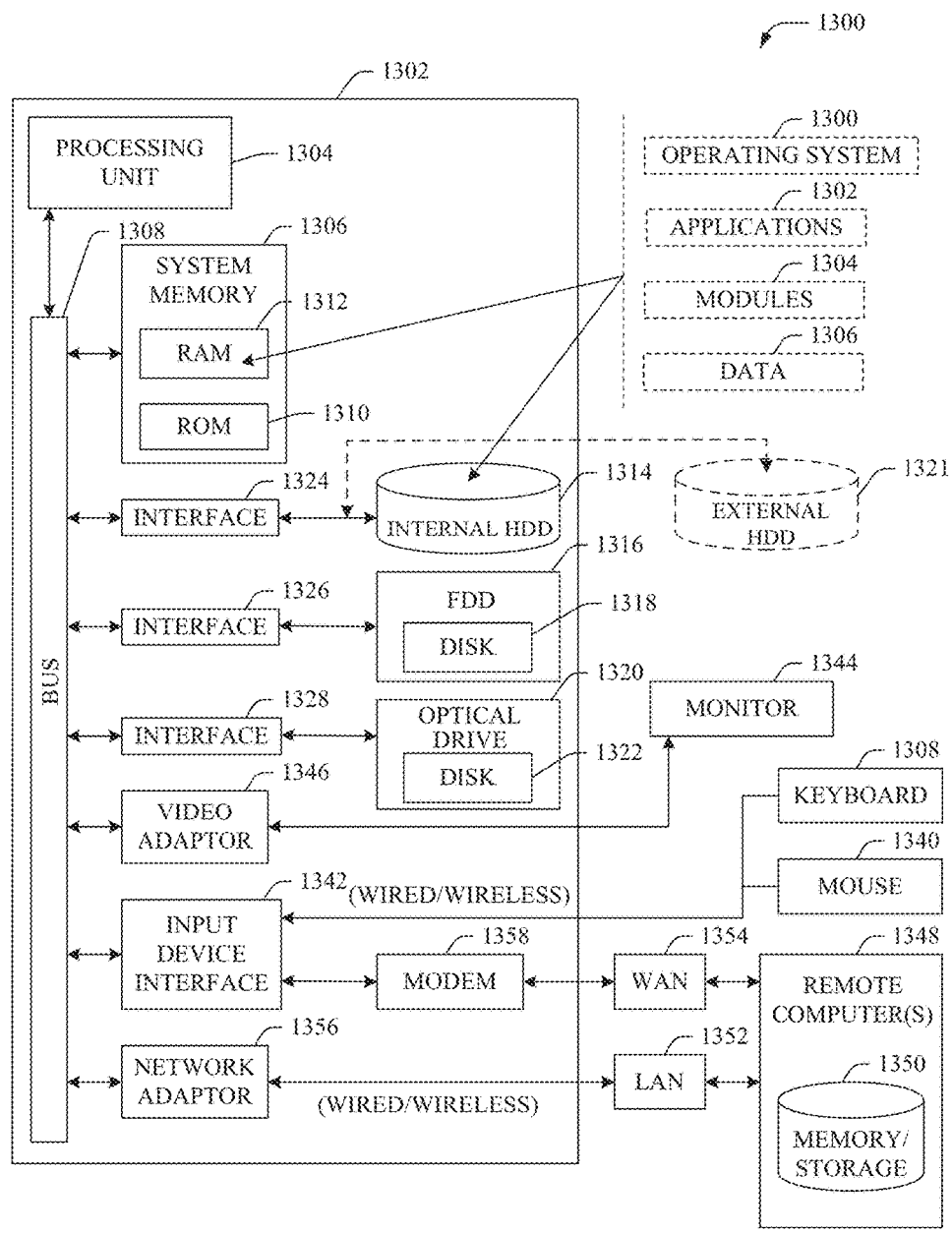
FIG. 13 illustrates a block diagram of a computer that can be employed in accordance with one or more embodiments described herein.

FIG. 13 illustrates a block diagram of a computer that can be employed in accordance with one or more embodiments. Repetitive description of like elements employed in other embodiments described herein is omitted for sake of brevity. In some embodiments, the computer, or a component of the computer, can be or be comprised within any number of components described herein comprising, but not limited to, mobile devices 102, 114, 116, control device 112 and/or access point devices 106, 108 (or a component of mobile devices 102, 114, 116, control device 112 and/or access point devices 106, 108).

In order to provide additional text for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable (or machine-readable) storage media and/or communications media, which two terms are used herein differently from one another as follows. Computer-readable (or machine-readable) storage media can be any available storage media that can be accessed by the computer (or a machine, device or apparatus) and comprises both volatile and nonvolatile media, removable and non-removable media. By way of example, and not limitation, computer-readable (or machine-readable) storage media can be implemented in connection with any method or technology for storage of information such as computer-readable (or machine-readable) instructions, program modules, structured data or unstructured data. Tangible and/or non-transitory computer-readable (or machine-readable) storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable (or machine-readable) storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable (or machine-readable) media, is to be understood to exclude only propagating intangible signals per se as a modifier and does not relinquish coverage of all standard storage, memory or computer-readable (or machine-readable) media that are not only propagating intangible signals per se.

In this regard, the term "non-transitory" herein as applied to storage, memory or computer-readable (or machine-readable) media, is to be understood to exclude only propagating transitory signals per se as a modifier and does not relinquish coverage of all standard storage, memory or computer-readable (or machine-readable) media that are not only propagating transitory signals per se.

Communications media typically embody computer-readable (or machine-readable) instructions, data structures, program modules or other structured or unstructured data in a data signal such as a modulated data signal, e.g., a channel wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 13, the example environment 1300 for implementing various embodiments of the embodiments described herein comprises a computer 1302, the computer 1302 comprising a processing unit 1304, a system memory 1306 and a system bus 1308. The system bus 1308 couples system components comprising, but not limited to, the system memory 1306 to the processing unit 1304. The processing unit 1304 can be any of various commercially available processors. Dual microprocessors and other multiprocessor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 comprises ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also comprise a high-speed RAM such as static RAM for caching data.

The computer 1302 further comprises an internal hard disk drive (HDD) 1310 (e.g., EIDE, SATA), which internal hard disk drive 1314 can also be configured for external use in a suitable chassis (not shown), a magnetic floppy disk drive 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface, respectively. The interface 1324 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable (or machine-readable) storage media provide nonvolatile storage of data, data structures, computer-executable instructions, and so forth. For the computer 1302, the drives and storage media accommodate the storage of any data in a suitable digital format. Although the description of computer-readable (or machine-readable) storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, comprising an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A communication device can enter commands and information into the computer 1302 through one or more wired/wireless input devices, e.g., a keyboard 1338 and a pointing device, such as a mouse 1340. Other input devices (not shown) can comprise a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a universal serial bus (USB) port, an IR interface, etc.

A monitor 1344 or other type of display device can be also connected to the system bus 1308 via an interface, such as a video adapter 1346. In addition to the monitor 1344, a computer typically comprises other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically comprises many or all of the elements described relative to the computer 1302, although, for purposes of brevity, only a memory/storage device 1350 is illustrated. The logical connections depicted comprise wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also comprise a wireless AP disposed thereon for communicating with the wireless adapter 1356.

When used in a WAN networking environment, the computer 1302 can comprise a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, $x=(x1, x2, x3, x4, \ldots, xn)$, to a confidence that the input belongs to a class, that is, $f(x)=\text{confidence(class)}$. Such classification can employ a probabilistic and/or statistical-based analysis (e.g., factoring into the analysis utilities and costs) to prognose or infer an action that a communication device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing communication device behavior, operator preferences, historical information, receiving extrinsic information). For example, SVMs can be configured via a learning or training phase within a classifier constructor and feature selection module. Thus, the classifier(s) can be used to automatically learn and perform a number of functions, comprising but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of communication device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable (or machine-readable) storage media, described herein can be either volatile memory or nonvolatile memory or can comprise both volatile and nonvolatile memory.

Memory disclosed herein can comprise volatile memory or nonvolatile memory or can comprise both volatile and nonvolatile memory. By way of illustration, and not limitation, nonvolatile memory can comprise read only memory (ROM), programmable ROM (PROM), electrically programmable ROM (EPROM), electrically erasable PROM (EEPROM) or flash memory. Volatile memory can comprise random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above comprises mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. An apparatus, comprising:
   a processor; and
   a memory that stores executable instructions that, when executed by the processor, facilitate performance of operations, comprising:
   generating, at a first time, first information in a repository of information specific to and stored at the apparatus, wherein the first information comprises an identifier for a first access point device and a determined acceptable signal strength usable to obtain an acceptable jitter value between the apparatus and the first access point device;
   initiating a defined type of communication via the first access point device, at a second time, based on a first determination that a detected signal strength at a third time satisfies a defined condition relative to the acceptable signal strength, wherein the second time is after the first time and wherein the third time is between the first time and the second time; and based on a second determination that a detected signal strength at the third time fails to satisfy the defined condition relative to the acceptable signal strength and in response to identifying a change in the detected signal strength to at least the determined acceptable signal strength, switching from being connected to a network device to the first access point device to initiate the defined type of communication via the first access point device.

2. The apparatus of claim 1, wherein the operations further comprise:
performing respective jitter tests on a group of access point devices in response to detecting respective signals of the access point devices at different times, wherein the group of access point devices does not comprise the first access point device; and
determining respective acceptable signal strengths for the group of access point devices based on respective results of the respective jitter tests for the group of access point devices.

3. The apparatus of claim 2, wherein the operations further comprise:
storing, in the repository of information, a group of identifiers for the group of access point devices and the respective acceptable signal strengths to obtain respective acceptable jitter values between the apparatus and the group of access point devices.

4. The apparatus of claim 1, wherein the operations further comprise:
updating a signal strength device value from a default signal strength device metric value to the determined acceptable signal strength to proceed to obtain the acceptable jitter value, and wherein the signal strength device value is stored locally at the apparatus.

5. The apparatus of claim 1, wherein the determined acceptable signal strength is a first determined acceptable signal strength, wherein the operations further comprise:
storing, for the identifier for the first access point device, a second determined acceptable signal strength, wherein the second determined acceptable signal strength is associated with a first frequency of the first access point device, and wherein the first determined acceptable signal strength is associated with a second frequency of the first access point device.

6. The apparatus of claim 1, wherein the determined acceptable signal strength is a first determined acceptable signal strength, wherein the operations further comprise:
storing, for the identifier for the first access point device, a second determined acceptable signal strength, wherein the second determined acceptable signal strength is applicable to a first user profile of the apparatus, and wherein the determined acceptable signal strength is applicable to a second user profile of the apparatus different than the first user profile.

7. The apparatus of claim 1, wherein the determined acceptable signal strength is a first determined acceptable signal strength, wherein the operations further comprise:
storing, for the identifier for the first access point device, a second determined acceptable signal strength, wherein the second determined acceptable signal strength is for a repeater device associated with the first access point device, and wherein the determined acceptable signal strength is for the first access point device.

8. The apparatus of claim 1, wherein the determined acceptable signal strength is a first determined acceptable signal strength, wherein the operations further comprise:
storing, for the identifier for the first access point device, a second determined acceptable signal strength, and wherein the second determined acceptable signal strength is for a first application in execution between the first access point device and the apparatus.

9. The apparatus of claim 8, wherein the determined acceptable signal strength is for a second application in execution between the first access point device and the apparatus, and wherein the second application is different than the first application.

10. The apparatus of claim 9, wherein the first application comprises a wireless fidelity voice application.

11. The apparatus of claim 10, wherein the second application comprises a cellular application supported by a cellular network device of a cellular network, and wherein the defined type of communication being initiated via the first access point device comprises the apparatus being switched from the cellular application to the wireless fidelity voice application for a voice call.

12. The apparatus of claim 9, wherein the second application comprises an internet of things application.

13. The apparatus of claim 12, wherein the first application comprises a cellular application supported by a cellular network device of a cellular network, wherein the apparatus is associated with a delivery vehicle, wherein the internet of things application tracks a delivery of merchandise from the delivery vehicle to the first access point device at a retail location, and wherein the defined type of communication being initiated via the first access point device comprises the apparatus being switched, to use the cellular application, from a first connection with a first network device of a radio frequency identification network to a second connection with a second network device of the cellular network.

14. A method, comprising:
generating, by a device comprising a processor, at a first time, first information in a data store of information specific to and stored at the device, the first information comprising an identifier for a first access point device and a determined acceptable signal strength to obtain an acceptable jitter value between the device and the first access point device; and
initiating, by the device, a defined type of communication via the first access point device, at a second time, based on a first determination that a detected signal strength at a third time meets a condition defined relative to the acceptable signal strength, wherein the third time is between the first time and the second time.

15. The method of claim 14, further comprising:
determining, by the device, respective determined acceptable signal strengths for access point devices based on respective jitter tests for the access point devices; and
storing, by the device in the data store of information, respective identifiers for the access point devices and the respective determined acceptable signal strengths to obtain respective acceptable jitter values between the device and the access point devices.

16. The method of claim 15, wherein the respective determined acceptable signal strengths differ for different ones of respective types of applications in execution.

17. The method of claim 14, further comprising:
updating, by the device, a signal strength device value from a default signal strength device metric value to the determined acceptable signal strength to result in the acceptable jitter value, wherein the signal strength device metric value is stored locally at the device.

18. A non-transitory machine-readable storage medium, comprising executable instructions that, when executed by a processor, facilitate performance of operations, comprising:
- determining respective acceptable signal strengths based on tests performed for different access point devices, wherein the respective acceptable signal strengths are device specific and user profile specific;
- changing a default signal strength value stored in the device to the respective acceptable signal strengths; and
- determining whether to connect to a specified access point device of the different access point devices based on whether a measured signal strength for the specified access point device is at least equal to an acceptable signal strength for the specified access point device.

19. The non-transitory machine-readable storage medium of claim 18, wherein the acceptable signal strength is a first acceptable signal strength, and wherein the operations further comprise determining a second acceptable signal strength for a second specified access point device of the different access point devices based on a type of application in execution between the device and the second specified access point device.

20. The non-transitory machine-readable storage medium of claim 19, wherein the type of application comprises a push to talk application.

* * * * *